US005915123A

United States Patent [19]
Mirsky et al.

[11] Patent Number: 5,915,123
[45] Date of Patent: Jun. 22, 1999

[54] METHOD AND APPARATUS FOR CONTROLLING CONFIGURATION MEMORY CONTEXTS OF PROCESSING ELEMENTS IN A NETWORK OF MULTIPLE CONTEXT PROCESSING ELEMENTS

[75] Inventors: Ethan Mirsky, Mountain View; Robert French, Sunnyvale; Ian Eslick, Mountain View, all of Calif.

[73] Assignee: Silicon Spice, Mountain View, Calif.

[21] Appl. No.: 08/962,141

[22] Filed: Oct. 31, 1997

[51] Int. Cl.[6] .................. G06F 15/177; H03K 19/177
[52] U.S. Cl. .................. 395/800.16; 326/37; 326/38; 326/39; 395/653
[58] Field of Search .................. 326/38, 39, 37; 395/651, 653, 800.14, 800.15, 800.16

[56] References Cited

U.S. PATENT DOCUMENTS

| | | | |
|---|---|---|---|
| 4,597,041 | 6/1986 | Guyer et al. | 395/598 |
| 4,748,585 | 5/1988 | Chiarulli et al. | 395/800.15 |
| 4,754,412 | 6/1988 | Deering | 364/736.05 |
| 4,858,113 | 8/1989 | Saccardi | 395/312 |
| 4,870,302 | 9/1989 | Freeman | 326/41 |
| 5,020,059 | 5/1991 | Gorin et al. | 395/182.01 |
| 5,233,539 | 8/1993 | Agrawal et al. | 364/489 |
| 5,301,340 | 4/1994 | Cook | 395/800.24 |
| 5,336,950 | 8/1994 | Popli et al. | 326/39 |
| 5,426,378 | 6/1995 | Ong | 326/39 |
| 5,457,408 | 10/1995 | Leung | 326/38 |
| 5,469,003 | 11/1995 | Kean | 326/39 |
| 5,684,980 | 11/1997 | Casselman | 395/500 |
| 5,742,180 | 4/1998 | Detton et al. | 326/80 |
| 5,754,818 | 5/1998 | Mohamed | 711/207 |
| 5,765,209 | 6/1998 | Yetter | 711/207 |
| 5,778,439 | 7/1998 | Trinberger et al. | 711/153 |

OTHER PUBLICATIONS

Hon, et al; "Reinventing Computing", Mar. 1996; MIT AI Lab; p. 1.
Baker; "Programming Silicon"; Aug. 28, 1995; Electronic Engineering Times; p. 73.
Brown; "Smart Compilers Puncture Code Bloat"; Oct. 9, 1995; Electronic Engineering Times; pp. 38 and 42.
Snyder; "A Taxomony of Synchronous Parallel Machines"; Proceedings of the 1998 International Conference on Parallel Processing; Aug. 15–19, 1998; pp. 281–285.
Gray, et al.; "Configurable Hardware: A New Paradigm for Computation"; 1989; Massachusetts Institute of Technology; pp. 279–296.

(List continued on next page.)

*Primary Examiner*—Kenneth S. Kim
*Attorney, Agent, or Firm*—Blakely, Sokoloff, Taylor & Zafman

[57] ABSTRACT

A method and apparatus for providing local control of processing elements in a network of multiple context processing element are provided. A multiple context processing element is configured to store a number of configuration memory contexts. This multiple context processing element maintains data of a current configuration. State information is received from at least one other multiple context processing element. At least one configuration control signal is generated in response to the state information and the data of a current configuration. One of multiple configuration memory contexts is selected in response to the configuration control signal, the selected configuration memory context controlling the multiple context processing element. Each multiple context processing element in the networked array of multiple context processing elements has an assigned physical and virtual identification. Data is transmitted to at least one of the multiple context processing elements of the array, the data comprising control data, configuration data, an address mask, and a destination identification. The transmitted address mask is applied to either the physical or virtual identification and to a destination identification. The masked physical or virtual identification is compared to the masked destination identification. When the masked physical or virtual identification of a multiple context processing element matches the masked destination identification, at least one of the number of multiple context processing elements are manipulated in response to the transmitted data. Manipulation comprises selecting one of a number of configuration memory contexts to control the functioning of the multiple context processing element.

26 Claims, 23 Drawing Sheets

OTHER PUBLICATIONS

Carter, et al.; "A User Programmable Reconfigurable Logic Array"; IEEE 1986 Custom Integrated Circuits Conference; pp. 233–235.

Valero–Garcia, et al.; "Implementation of Systolic Algorithms Using Pipelined Functional Units"; IEEE Proceedings on the International Conf. on Application Specific Array Processors; Sep. 5–7, 1990;pp. 273–283.

Razdan, et al; "A High–Performance Microarchitecture with Hardware–Programmable Functional Units"; MIcro–27 Proceedings of the 27th Annual International Symposium on Microarchitecture Nov. 30–Dec. 2, 1994; pp. 172–180.

Guo, et al.; "A Novel Programmable Interconnect Architecture with Decoded Ram Storage"; Proceedings of the IEEE Custom Integrated Circuits Conference; May 1–4, 1994; pp. 193–196.

Vuillemin, et al.; "Programmable Active Memories: Reconfigurable Systems Come of Age"; IEEE Transactions on VLSI Systems; 1995; pp. 1–15.

Johnson, et al.; "General–Purpose Systolic Arrays"; IEEE Nov. 1993; pp. 20–31.

Clark; "Pilkington preps reconfigurable video DSP"; EE Times, week of Jul. 31, 1995.

Fiske, et al.; "The Reconfigurable Arithmetic Processor"; The 15th. Annual International Symposium on Computer Architecture; May 30–Jun. 2, 1988; pp. 30–36.

Beal, et al.; Design of a Processor Element for a High Performance Massively Parallel SIMD System; Int'l Journal of High Speed Computing, vol. 7, No.3; Sep. 1995; pp. 365–390.

Snyder; "An Inquiry into the Benefits of Multigauge Parallel Computation"; Proceedings of the 1995 International Conference on Parallel Processing; Aug. 20–23, 1995; pp. 488–492.

Wang, et al.; "An Array Architecture for Reconfigurable Datapaths"; "More FPGAs", W.R. Moore & W. Luk; 1994 Abingdon EE&CS Books; pp. 35–46.

Bridges; "The GPA Machine: A Generally Partitionable MSIMD Architecture"; IEEE Third Symposium on The Frontiers of Massively Parallel Computation Feb. 1990; pp. 196–203.

Morton, et al.; "The Dynamically Reconfigurable CAP Array Chip I"; IEEE Journal of Solid–State Circuits, vol. SC–21, No. 5, Oct. 1986; pp. 820–826.

Alexander, et al.; "A Reconfigurable Approach to a Systolic Sorting Architecture"; IEEE Feb. 1989; pp. 1178–1182.

Blazek, et al. ; "Design of a Reconfigurable Parallel RISC–Machine"; North–Holland Microprocessing and Microprogramming, 1987; pp. 39–46.

Masera, et al.; "A Microprogrammable Parallel Architecture for DSP"; Proceedings of the International Conference on Circuits and Systems, Jun. 1991; pp. 824–827.

Xilinx Advance Product Information; "XC6200 Field Programmable Gate Arrays"; Jan. 9, 1997 (Version 1.8); pp. 1–53.

Sowa, et al.; "Parallel Execution on the Function–Partitioned Processor with Multiple Instruction Streams"; Systems and Computers in Japan, vol. 22, No. 4, 1991; pp. 22–27.

Wang, et al.; "Distributed Instruction Set Computer"; Proceedings of the 1988 International Conference on Parallel Processing; Aug. 15–19, 1988; pp. 426–429.

| COUNT | BYTE | BYTE CONTENTS |
|---|---|---|
| 1 | MASK HIGH BYTE | {1'b1, MASK[14:8]} |
| 2 | ADDRESS HIGH BYTE | {VIRTUAL/PHYSICAL SELECT, ADDRESS[14:8]} |
| 3 | MASK LOW BYTE | MASK [7:0] |
| 4 | ADDRESS LOW BYTE | ADDRESS[7:0] |
| 6 | CONTEXT | SEE FIGURE 9 |
| 5 | BYTE COUNT | COUNT[7:0] |
| 7 ... | BYTE STREAM | DATA |

FIG. 8

| CONTEXT | BIT <7> READ/WRITE | BITS<6:3>* (MAJOR CONTEXT) | BITS<2:0>* (MINOR CONTEXT) |
|---|---|---|---|
| HARDWIRED RESET CONTEXT | READ = 1'b0; WRITE = 1'b1; | 0 | 0 |
| | | | 1 |
| | | | 7 |
| HARDWIRED STALL CONTEXT | | 1 | 0 |
| | | | 1 |
| | | | 7 |
| PROGRAMMABLE RUN CONTEXT | | 2 | 0 |
| | | | 1 |
| | | | 7 |
| PROGRAMMABLE RUN CONTEXT | | 3 | 0 |
| | | | 1 |
| | | | 7 |
| MAIN MEMORY | | 8 | 0 |
| BLOCK ID | | 9 | 0 |
| FSM STATE | | 10 | 0 |

*FIG. 9*

METHOD AND APPARATUS FOR CONTROLLING CONFIGURATION MEMORY CONTEXTS OF PROCESSING ELEMENTS IN A NETWORK OF MULTIPLE CONTEXT PROCESSING ELEMENTS

FIELD OF THE INVENTION

This invention relates to array based computing devices. More particularly, this invention relates to a semiconductor chip architecture that provides for local control of field programmable gate arrays in a network configuration.

BACKGROUND OF THE INVENTION

Advances in semiconductor technology have greatly increased the processing power of a single chip general purpose computing device. The relatively slow increase in the inter-chip communication bandwidth requires modern high performance devices to use as much of the potential on chip processing power as possible. This results in large, dense integrated circuit devices and a large design space of processing architectures. This design space is generally viewed in terms of granularity, wherein granularity dictates that designers have the option of building very large processing units, or many smaller ones, in the same silicon area. Traditional architectures are either very coarse grain, like microprocessors, or very fine grain, like field programmable gate arrays (FPGAs).

Microprocessors, as coarse grain architecture devices, incorporate a few large processing units that operate on wide data words, each unit being hardwired to perform a defined set of instructions on these data words. Generally, each unit is optimized for a different set of instructions, such as integer and floating point, and the units are generally hardwired to operate in parallel. The hardwired nature of these units allows for very rapid instruction execution. In fact, a great deal of area on modern microprocessor chips is dedicated to cache memories in order to support a very high rate of instruction issue. Thus, the devices efficiently handle very dynamic instruction streams.

Most of the silicon area of modern microprocessors is dedicated to storing data and instructions and to control circuitry. Therefore, most of the silicon area is dedicated to allowing computational tasks to heavily reuse the small active portion of the silicon, the arithmetic logic units (ALUs). Consequently very little of the capacity inherent in a processor gets applied to the problem; most of the capacity goes into supporting a high diversity of operations.

Field programmable gate arrays, as very fine grain devices, incorporate a large number of very small processing elements. These elements are arranged in a configurable interconnected network. The configuration data used to define the functionality of the processing units and the network can be thought of as a very large semantically powerful instruction word allowing nearly any operation to be described and mapped to hardware.

Conventional FPGAs allow finer granularity control over processor operations, and dedicate a minimal area to instruction distribution. Consequently, they can deliver more computations per unit of silicon than processors, on a wide range of operations. However, the lack of resources for instruction distribution in a network of prior art conventional FPGAs make them efficient only when the functional diversity is low, that is when the same operation is required repeatedly and that entire operation can be fit spatially onto the FPGAs in the system.

Furthermore, in prior art FPGA networks, retiming of data is often required in order to delay data. This delay is required because data that is produced by one processing element during one clock cycle may not be required by another processing element until several clock cycles after the clock cycle in which it was made available. One prior art technique for dealing with this problem is to configure some processing elements to function as memory devices to store this data. Another prior art technique configures processing elements as delay registers to be used in the FPGA network. The problem with both of these prior art technique is that valueable silicon is wasted by using processing elements as memory and delay registers.

Dynamically programmable gate arrays (DPGAs) dedicate a modest amount of on-chip area to store additional instructions allowing them to support higher operational diversity than traditional FPGAs. However, the silicon area necessary to support this diversity must be dedicated at fabrication time and consumes area whether or not the additional diversity is required. The amount of diversity supported, that is, the number of instructions supported, is also fixed at fabrication time. Furthermore, when regular data path operations are required all instruction stores are required to be programmed with the same data using a global signal broadcasted to all DPGAs.

The limitations present in the prior art FPGA and DPGA networks in the form of limited control over configuration of the individual FPGAs and DPGAs of the network severely limits the functional diversity of the networks. For example, in one prior art FPGA network, all FPGAs must be configured at the same time to contain the same configurations. Consequently, rather than separate the resources for instruction storage and distribution from the resources for data storage and computation, and dedicate silicon resources to each of these resources at fabrication time, there is a need for an architecture that unifies these resources. Once unified, traditional instruction and control resources can be decomposed along with computing resources and can be deployed in an application specific manner. Chip capacity can be selectively deployed to dynamically support active computation or control reuse of computational resources depending on the needs of the application and the available hardware resources.

SUMMARY OF THE INVENTION

A method and apparatus for providing local control of processing elements in a network of multiple context processing element are provided. According to one aspect of the invention, a multiple context processing element is configured to store a number of configuration memory contexts. This multiple context processing element maintains data of a current configuration. State information is received from at least one other multiple context processing element. The state information comprises at least one bit received over a multiple level network, the bit representative of at least one configuration memory context of the multiple context processing element from which it is received. At least one configuration control signal is generated in response to the state information and the data of a current configuration. One of multiple configuration memory contexts is selected in response to the received state information and the data of a current configuration. The selected configuration memory context controls the multiple context processing element.

Each multiple context processing element in the networked array of multiple context processing elements has an assigned physical and virtual identification. Data is transmitted to at least one of the multiple context processing elements of the array, the data comprising control data, configuration data, an address mask, and a destination identification. The transmitted address mask is applied to either the physical or virtual identification and to a destination identification. The masked physical or virtual identification is compared to the masked destination identification. When the masked physical or virtual identification of a multiple context processing element matches the masked destination identification, at least one of the number of multiple context processing elements are manipulated in response to the transmitted data. Manipulation comprises selecting one of a number of configuration memory contexts to control the functioning of the multiple context processing element.

These and other features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figures of the accompanying drawings, in which like references indicate similar elements and in which:

FIG. 8 is the encoding of the configuration byte stream as received by the CNI in one embodiment.

FIG. 9 is the encoding of the command/context byte in one embodiment.

DETAILED DESCRIPTION OF THE INVENTION

A method and an apparatus for retiming in a network of multiple context processing elements are provided. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1:
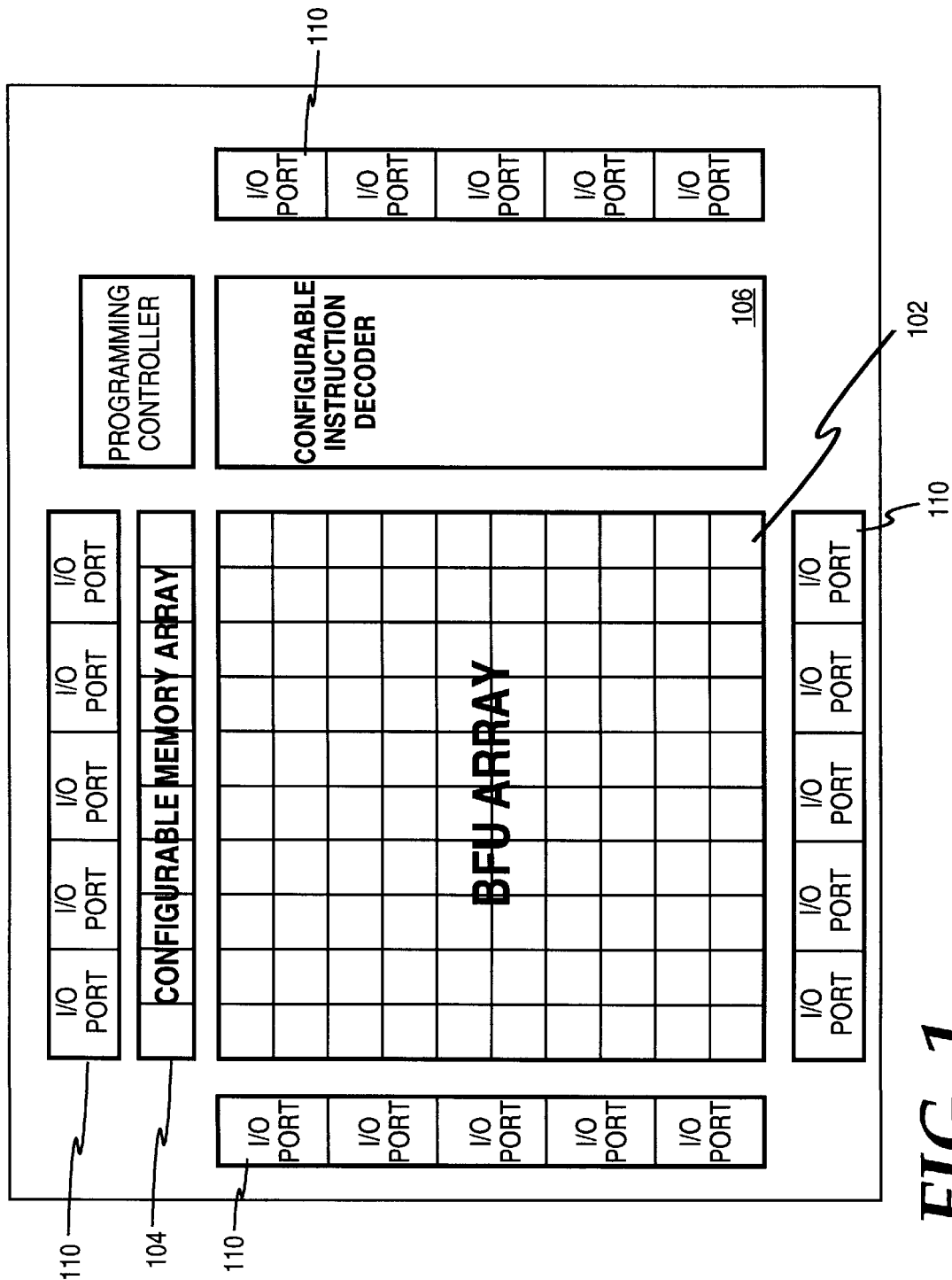
FIG. 1 is the overall chip architecture of one embodiment. This chip architecture comprises many highly integrated components.

FIG. 1 is the overall chip architecture of one embodiment. This chip architecture comprises many highly integrated components. While prior art chip architectures fix resources at fabrication time, specifically instruction source and distribution, the chip architecture of the present invention is flexible. This architecture uses flexible instruction distribution that allows position independent configuration and control of a number of multiple context processing elements (MCPEs) resulting in superior performance provided by the MCPEs. The flexible architecture of the present invention uses local and global control to provide selective configuration and control of each MCPE in an array; the selective configuration and control occurs concurrently with present function execution in the MCPEs.

The chip of one embodiment of the present invention is composed of, but not limited to, a 10×10 array of identical eight-bit functional units, or MCPEs 102, which are connected through a reconfigurable interconnect network. The MCPEs 102 serve as building blocks out of which a wide variety of computing structures may be created. The array size may vary between 2×2 MCPEs and 16×16 MCPEs, or even more depending upon the allowable die area and the desired performance. A perimeter network ring, or a ring of network wires and switches that surrounds the core array, provides the interconnect between the MCPEs and perimeter functional blocks.

Surrounding the array are several specialized units that may perform functions that are too difficult or expensive to decompose into the array. These specialized units may be coupled to the array using selected MCPEs from the array. These specialized units can include large memory blocks called configurable memory blocks 104. In one embodiment these configurable memory blocks 104 comprise eight blocks, two per side, of 4 kilobyte memory blocks. Other specialized units include at least one configurable instruction decoder 106.

Furthermore, the perimeter area holds the various interfaces that the chip of one embodiment uses to communicate with the outside world including: input/output (I/O) ports; a peripheral component interface (PCI) controller, which may be a standard 32-bit PCI interface; one or more synchronous burst static random access memory (SRAM) controllers; a programming controller that is the boot-up and master control block for the configuration network; a master clock input and phase-locked loop (PLL) control/configuration; a Joint Test Action Group (JTAG) test access port connected to all the serial scan chains on the chip; and I/O pins that are the actual pins that connect to the outside world.

Figure 2:
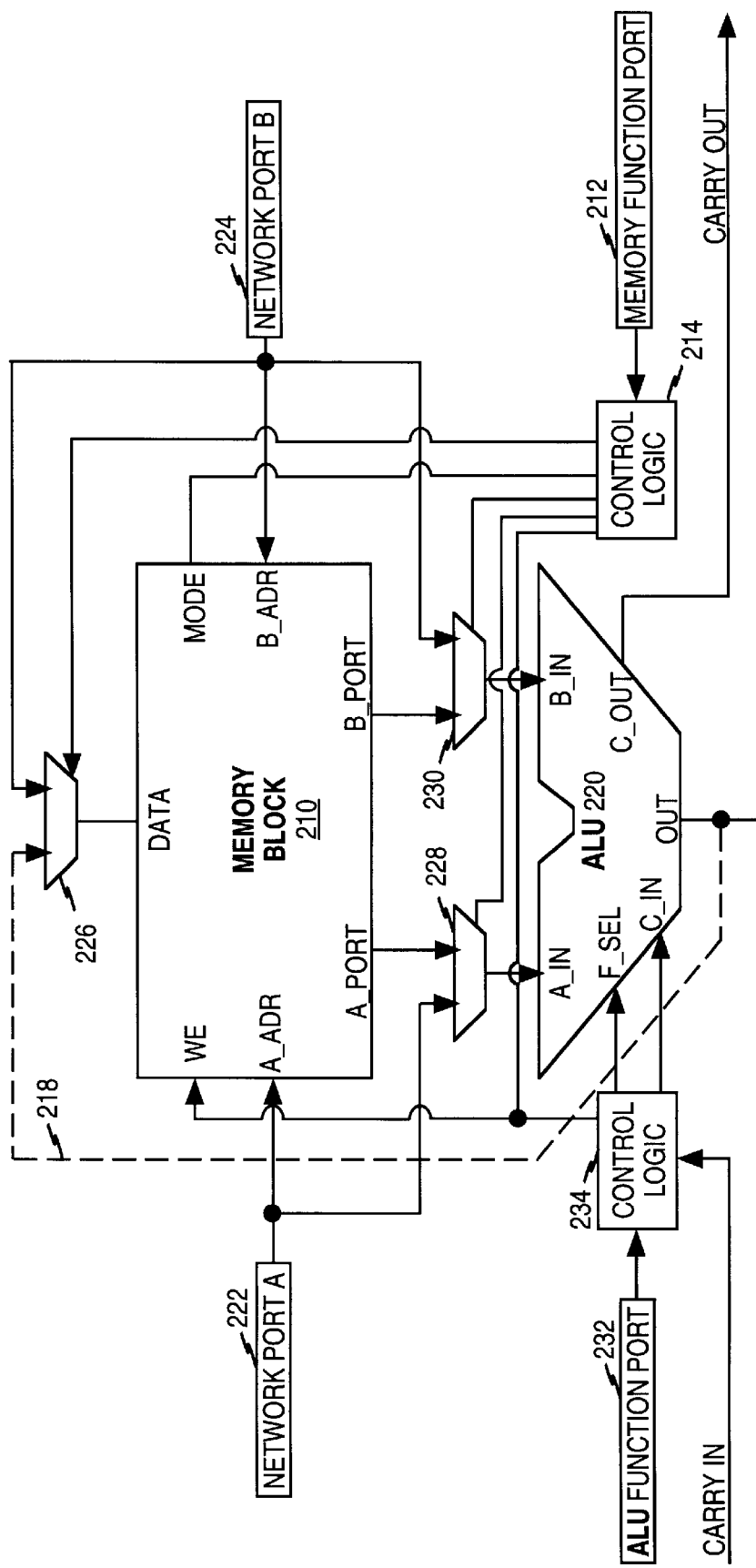
FIG. 2 is an eight bit MCPE core of one embodiment of the present invention.

FIG. 2 is an eight bit MCPE core of one embodiment of the present invention. Primarily the MCPE core comprises memory block 210 and basic ALU core 220. The main memory block 210 is a 256 word by eight bit wide memory, which is arranged to be used in either single or dual port modes. In dual port mode the memory size is reduced to 128 words in order to be able to perform two simultaneous read operations without increasing the read latency of the memory. Network port A 222, network port B 224, ALU function port 232, control logic 214 and 234, and memory function port 212 each have configuration memories (not shown) associated with them. The configuration memories of these elements are distributed and are coupled to a Configuration Network Interface (CNI) (not shown) in one embodiment. These connections may be serial connections but are not so limited. The CNI couples all configuration memories associated with network port A 222, network port B 224, ALU function port 232, control logic 214 and 234, and memory function port 212 thereby controlling these configuration memories. The distributed configuration memory stores configuration words that control the configuration of the interconnections. The configuration memory also stores configuration information for the control architecture. Optionally it can also be a multiple context memory that receives context selecting signals broadcasted globally and locally from a variety of sources.

Figure 3:
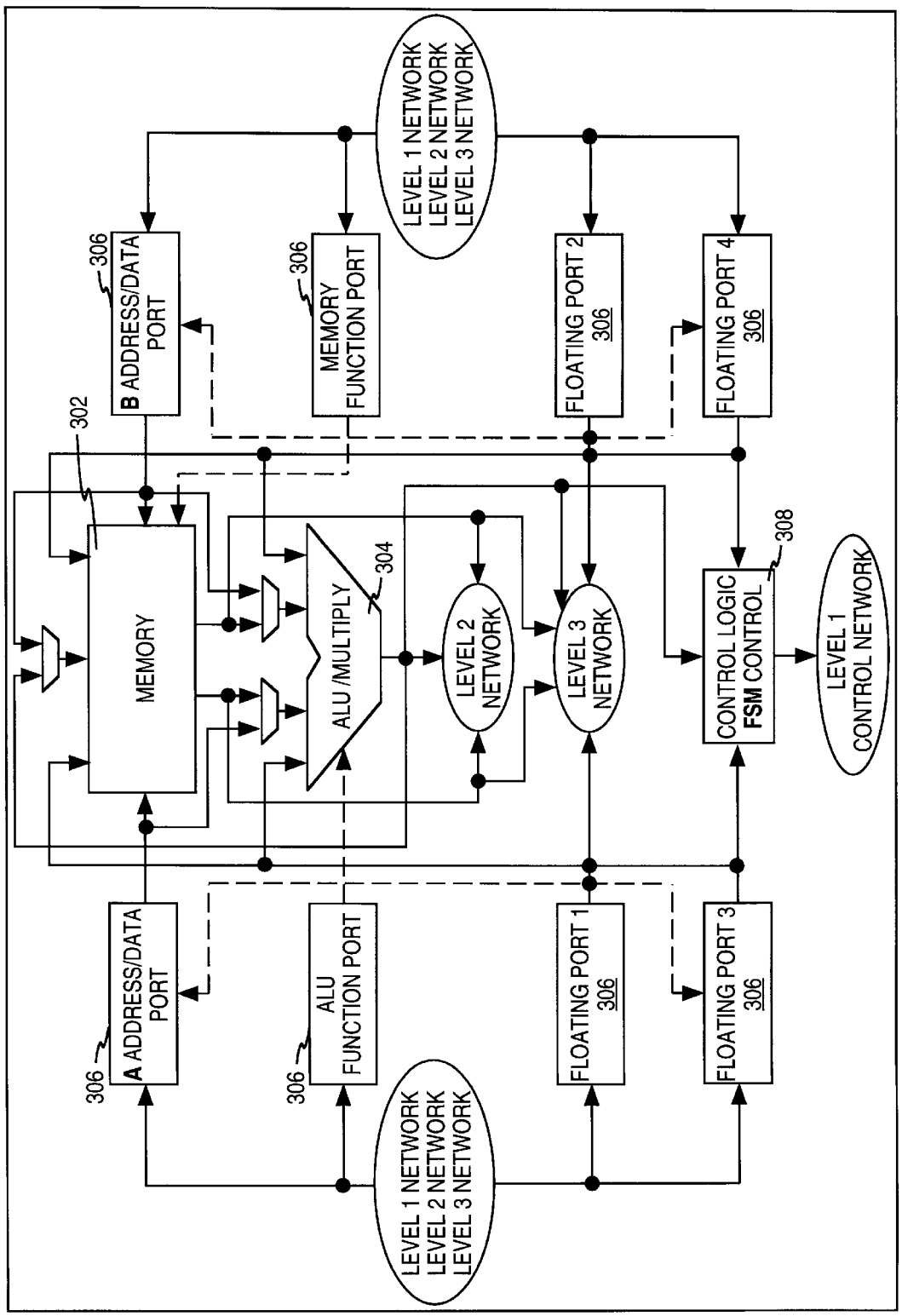
FIG. 3 is a data flow diagram of the MCPE of one embodiment.

The structure of each MCPE allows for a great deal of flexibility when using the MCPEs to create networked processing structures. FIG. 3 is a data flow diagram of the MCPE of one embodiment. The major components of the MCPE include static random access memory (SRAM) main memory 302, ALU with multiplier and accumulate unit 304, network ports 306, and control logic 308. The solid lines mark data flow paths while the dashed lines mark control paths; all of the lines are one or more bits wide in one embodiment. There is a great deal of flexibility available within the MCPE because most of the major components may serve several different functions depending on the MCPE configuration.

The MCPE main memory 302 is a group of 256 eight bit SRAM cells that can operate in one of four modes. It takes in up to two eight bit addresses from A and B address/data ports, depending upon the mode of operation. It also takes in up to four bytes of data, which can be from four floating ports, the B address/data port, the ALU output, or the high byte from the multiplier. The main memory 302 outputs up to four bytes of data. Two of these bytes, memory A and B, are available to the MCPE's ALU and can be directly driven onto the level 2 network. The other two bytes, memory C and D, are only available to the network. The output of the memory function port 306 controls the cycle-by-cycle operation of the memory 302 and the internal MCPE data paths as well as the operation of some parts of the ALU 304 and the control logic 308. The MCPE main memory may also be implemented as a static register file in order to save power.

Each MCPE contains a computational unit 304 comprised of three semi-independent functional blocks. The three semi-independent functional blocks comprise an eight bit wide ALU, an 8×8 to sixteen bit multiplier, and a sixteen bit accumulator. The ALU block, in one embodiment, performs logical, shift, arithmetic, and multiplication operations, but is not so limited. The ALU function port 306 specifies the cycle-by-cycle operation of the computational unit. The computational units in orthogonally adjacent MCPEs can be chained to form wider-word datapaths.

The MCPE network ports connect the MCPE network to the internal MCPE logic (memory, ALU, and control). There are eight ports in each MCPE, each serving a different set of purposes. The eight ports comprise two address/data ports, two function ports, and four floating ports. The two address/data ports feed addresses and data into the MCPE memories and ALU. The two function ports feed instructions into the MCPE logic. The four floating ports may serve multiple functions. The determination of what function they are serving is made by the configuration of the receivers of their data.

The MCPEs of one embodiment are the building blocks out of which more complex processing structures may be created. The structure that joins the MCPE cores into a complete array in one embodiment is actually a set of several mesh-like interconnect structures. Each interconnect structure forms a network, and each network is independent in that it uses different paths, but the networks do join at the MCPE input switches. The network structure of one embodiment of the present invention is comprised of a local area broadcast network (level 1), a switched interconnect network (level 2), a shared bus network (level 3), and a broadcast, or configuration, network.

Figure 4:
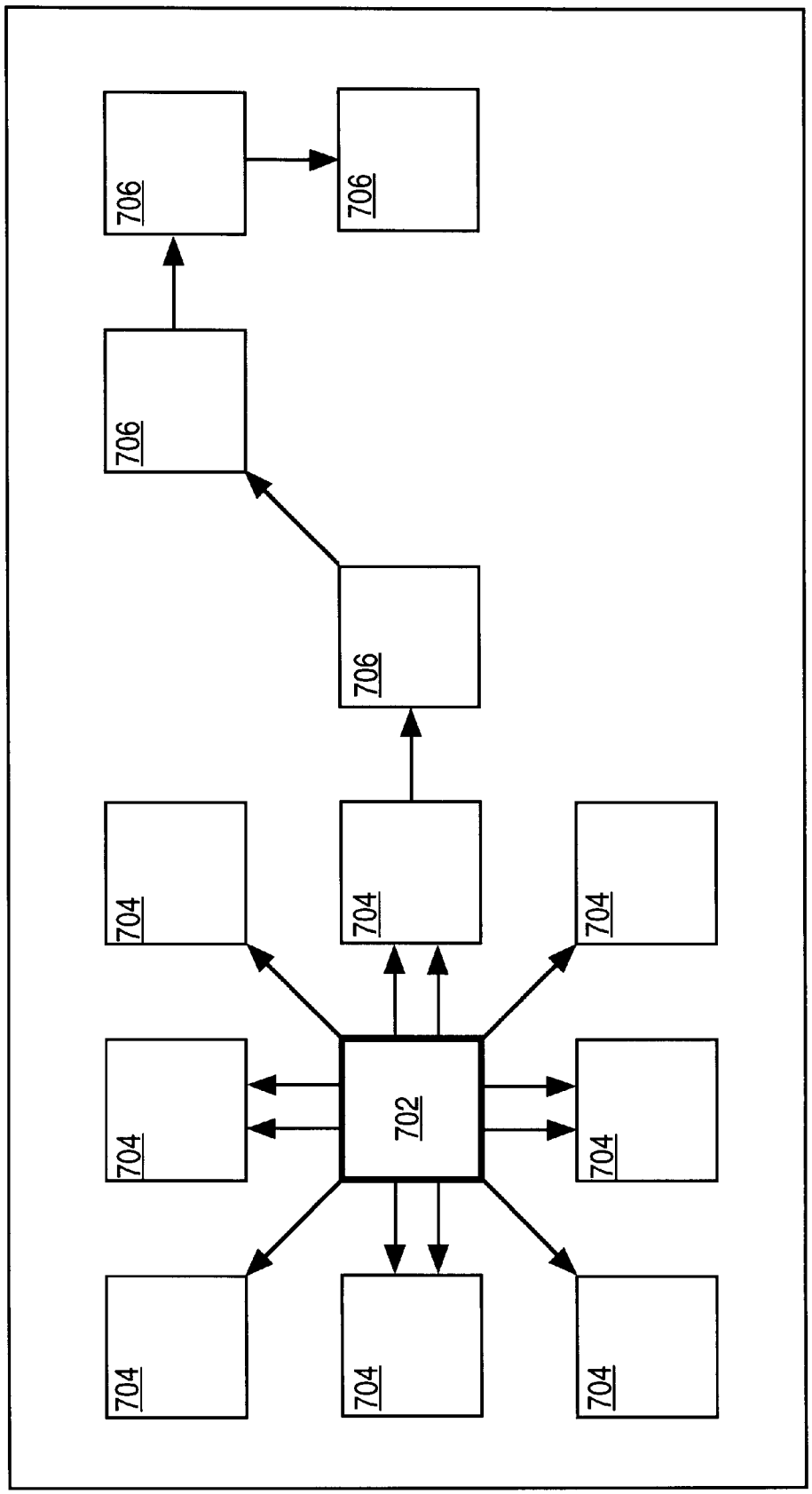
FIG. 4 is the level 1 network of one embodiment.

FIG. 4 is the level 1 network of one embodiment. The level 1 network, or bit-wide local interconnect, consists of direct point-to-point communications between each MCPE 702 and the eight nearest neighbors 704. Each MCPE 702 can output up to 12 values comprising two in each of the orthogonal directions, and one in each diagonal. The level 1 network carries bit-oriented control signals between these local groups of MCPEs. The connections of level 1 only travel one MCPE away, but the values can be routed through the level 1 switched mesh structure to other MCPEs 706. Each connection consists of a separate input and output wire. Configuration for this network is stored along with MCPE configuration.

Figure 5:
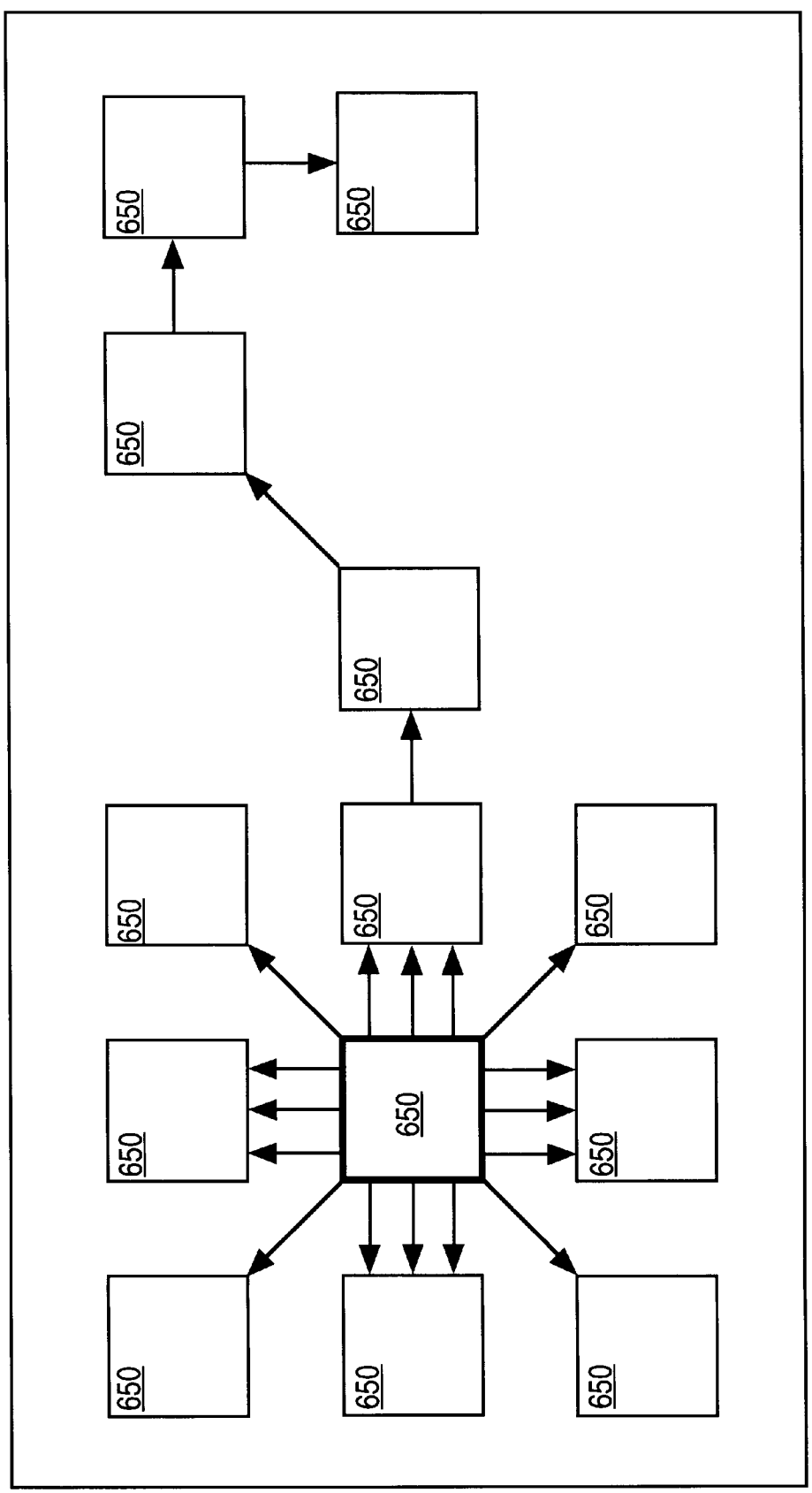
FIG. 5 is the level 2 network of one embodiment.

FIG. 5 is the level 2 network of one embodiment. The level 2 network, or byte-wide local interconnect, is used to carry data, instructions, or addresses in local groups of MCPEs 650. It is a byte-wide version of level 1 having additional connections. This level uses relatively short wires linked through a set of switches. The level 2 network is the primary means of local and semi-local MCPE communication, and level 2 does require routing. Using the level 2 network each MCPE 650 can output up to 16 values, at least two in each of the orthogonal directions and at least one in each diagonal. Each connection consists of separate input and output wires. These connections only travel one MCPE away, but the values can be routed through level 2 switches to other MCPEs. Preferably configuration for this network is also stored along with MCPE configuration.

Figure 6:
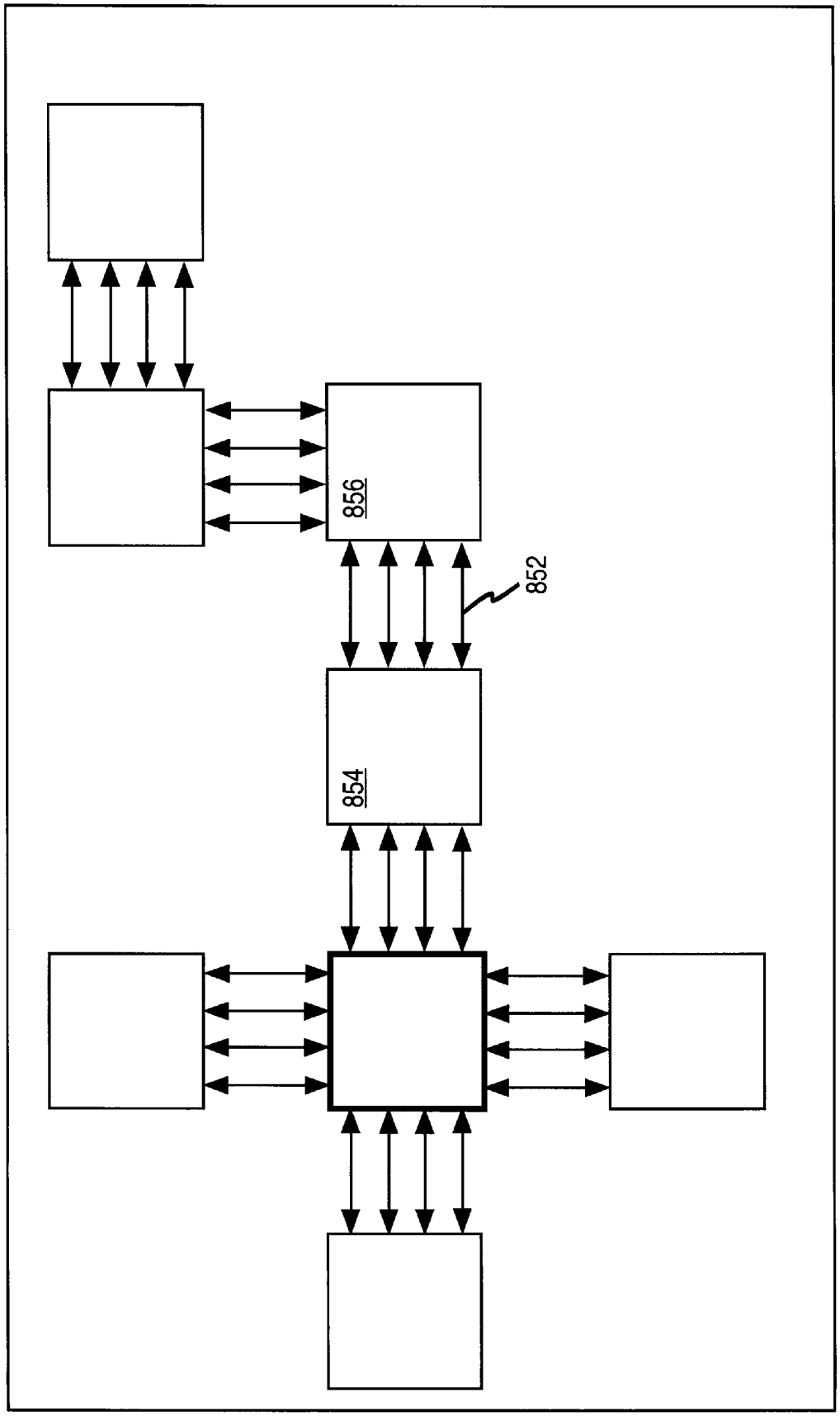
FIG. 6 is the level 3 network of one embodiment.

FIG. 6 is the level 3 network of one embodiment. In this one embodiment, the level 3 network comprises connections 852 of four channels between each pair of MCPEs 854 and 856 arranged along the major axes of the MCPE array providing for communication of data, instructions, and addresses between groups of MCPEs and between MCPEs and the perimeter of the chip. Preferably communication using the level 3 network is bi-directional and dynamically routable. A connection between two endpoints through a series of level 3 array and periphery nodes is called a "circuit" and may be set up and taken down by the configuration network. In one embodiment, each connection 852 consists of an 8-bit bidirectional port.

Figure 7:
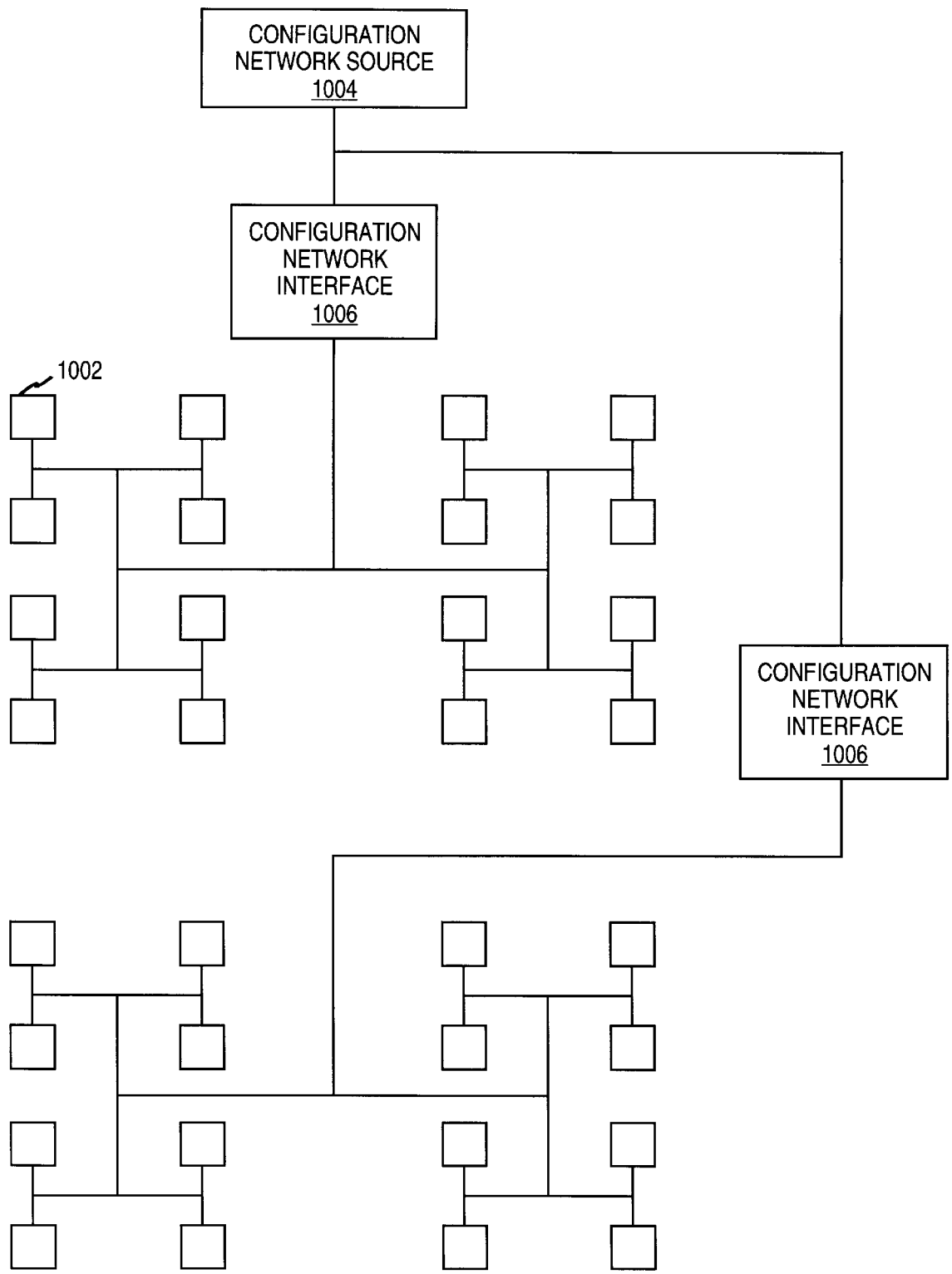
FIG. 7 is the broadcast, or configuration, network used in one embodiment.

FIG. 7 is the broadcast, or configuration, network used in one embodiment. This broadcast network is an H-tree network structure with a single source and multiple receivers in which individual MCPEs 1002 may be written to. This broadcast network is the mechanism by which configuration memories of both the MCPEs and the perimeter units get programmed. The broadcast network may also be used to communicate the configuration data for the level 3 network drivers and switches.

The broadcast network in one embodiment comprises a nine bit broadcast channel that is structured to both program and control the on-chip MCPE 1002 configuration memories. The broadcast network comprises a central source, or Configuration Network Source (CNS) 1004, and one Configuration Network Interface (CNI) block 1006 for each major component, or one in each MCPE with others assigned to individual or groups of non-MCPE blocks. The CNI 1006 comprises a hardwired finite state machine, several state registers, and an eight bit loadable clearable counter used to maintain timing. The CNS 1004 broadcasts to the CNIs 1006 on the chip according to a specific protocol. The network is arranged so that the CNIs 1006 of one embodiment receive the broadcast within the same clock cycle. This allows the broadcast network to be used as a global synchronization mechanism as it has a fixed latency to all parts of the chip. Therefore, the broadcast network functions primarily to program the level 3 network, and to prepare receiving CNIs for configuration transactions. Typically, the bulk of configuration data is carried over the level 3 network, however the broadcast network can also serve that function. The broadcast network has overriding authority over any other programmable action on the chip.

A CNI block is the receiving end of the broadcast network. Each CNI has two addresses: a physical, hardwired address and a virtual, programmable address. The latter can be used with a broadcast mask, discussed herein, that allows multiple CNIs to receive the same control and programming signals. A single CNI is associated with each MCPE in the networked MCPE array. This CNI controls the reading and writing of the configuration of the MCPE contexts, the MCPE main memory, and the MPCE configuration controller.

The CNS 1004 broadcasts a data stream to the CNIs 1006 that comprises the data necessary to configure the MCPEs 1002. In one embodiment, this data comprises configuration data, address mask data, and destination identification data. FIG. 8 is the encoding of the configuration byte stream as received by the CNI in one embodiment. The first four bytes are a combination of mask and address where both mask and address are 15 bit values. The address bits are only tested when the corresponding mask is set to "1". The high bit of the Address High Byte is a Virtual/Physical identification selection. When set to "1", the masked address is compared to the MCPE virtual, or programmable, identification; when set to "0" the masked address is compared to the MCPE physical address. This address scheme applies to a CNI block whether or not it is in an MCPE.

Following the masked address is a command/context byte which specifies which memory will be read from or written to by the byte stream. FIG. 9 is the encoding of the command/context byte in one embodiment. Following the command/context byte is a byte-count value. The byte count indicates the number of bytes that will follow.

Figure 10:
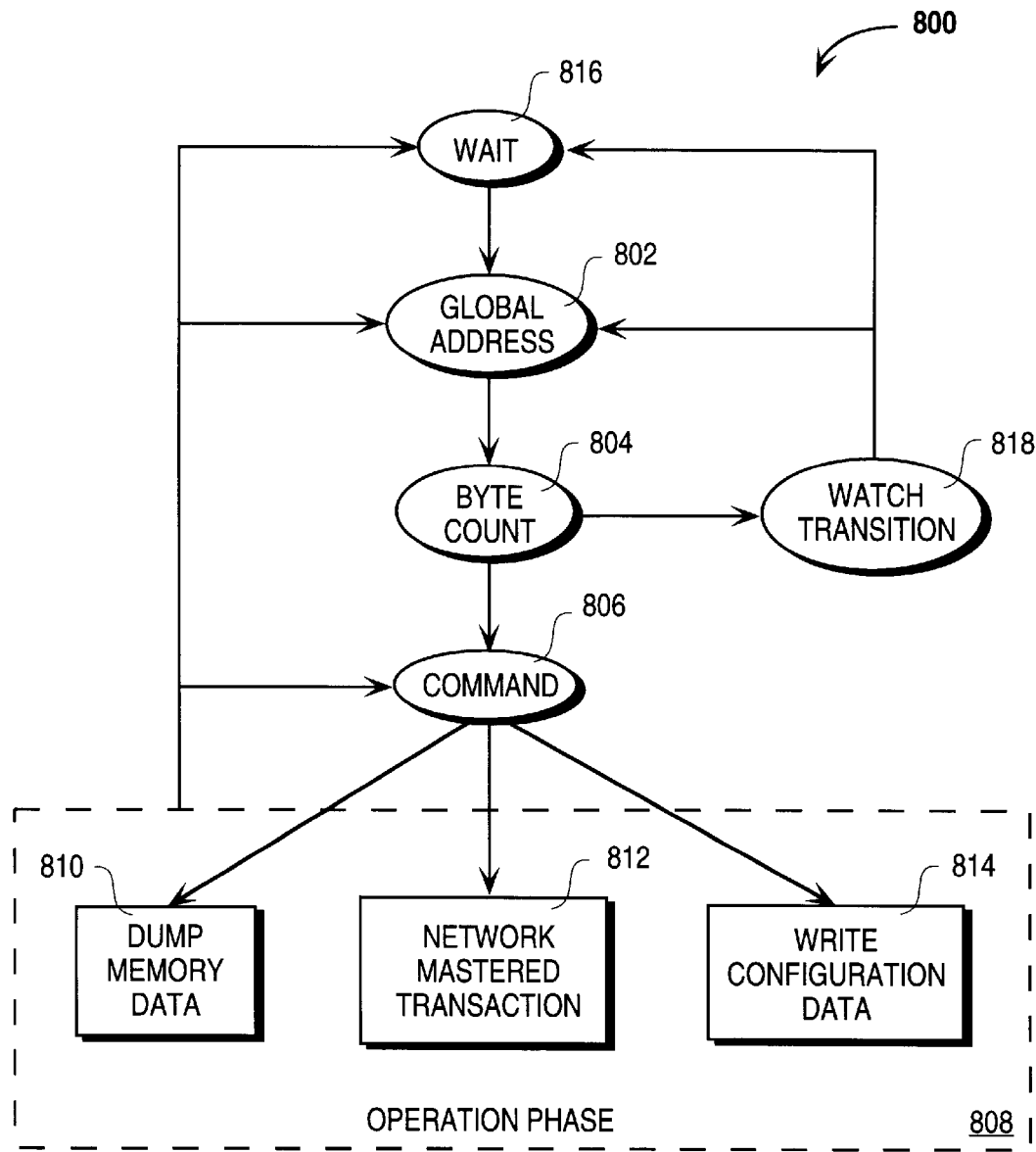
FIG. 10 is a flowchart of a broadcast network transaction.

As previously discussed, the CNS 1004 broadcasts a data stream to the CNIs 1006 that comprises the data necessary to configure the MCPEs 1002. In one embodiment, this data comprises configuration data, address mask data, and destination identification data. A configuration network protocol defines the transactions on the broadcast network. FIG. 10 is a flowchart 800 of one embodiment of a broadcast network transaction. In this embodiment, a transaction can contain four phases: global address 802, byte count 804, command 806, and operation 808. The command 806 and operation 808 phases may be repeated as much as desired within a single transaction.

The global address phase 802 is used to select a particular receiver or receivers, or CNI blocks, and all transactions of an embodiment begin with the global address phase 802. This phase 802 comprises two modes, a physical address mode and a virtual address mode, selected, for example, using a prespecified bit of a prespecified byte of the transaction. The physical address mode allows the broadcast network to select individual CNIs based on hardwired unique identifiers. The virtual address mode is used to address a single or multiple CNIs by a programmable identifier thereby allowing the software to design its own address space. At the end of the global address phase 802, the CNIs know whether they have been selected or not.

Following the global address phase 802, a byte count 804 of the transaction is transmitted so as to allow both selected and unselected CNIs to determine when the transaction ends. The selected CNIs enter the command phase 806; the CNIs not selected watch the transaction 818 and wait 816 for the duration of the byte count. It is contemplated that other processes for determining the end of a transaction may also be used.

During the command phase 806, the selected CNIs can be instructed to write the data on the next phase into a particular context, configuration, or main memory (write configuration data 814), to listen to the addresses, commands and data coming over the network (network mastered transaction 812), or to dump the memory data on to a network output (dump memory data 810). Following the command phase 806, the data is transmitted during the operation phase 808.

The network mastered transaction mode 812 included in the present embodiment commands the CNI to look at the data on the output of the level 3 network. This mode allows multiple configuration processes to take place in parallel. For example, a level 3 connection can be established between an offchip memory, or configuration storage, and a group of MCPEs and the MCPEs all commanded to enter the network mastered mode. This allows those MCPEs to be configured, while the broadcast network can be used to configure other MCPEs or establish additional level 3 connections to other MCPEs.

Following completion of the operation phase 808, the transaction may issue a new command, or it can end. If it ends, it can immediately be followed by a new transaction. If the byte count of the transaction has been completed, the transaction ends. Otherwise, the next byte is assumed to be a new command byte.

Figure 11:
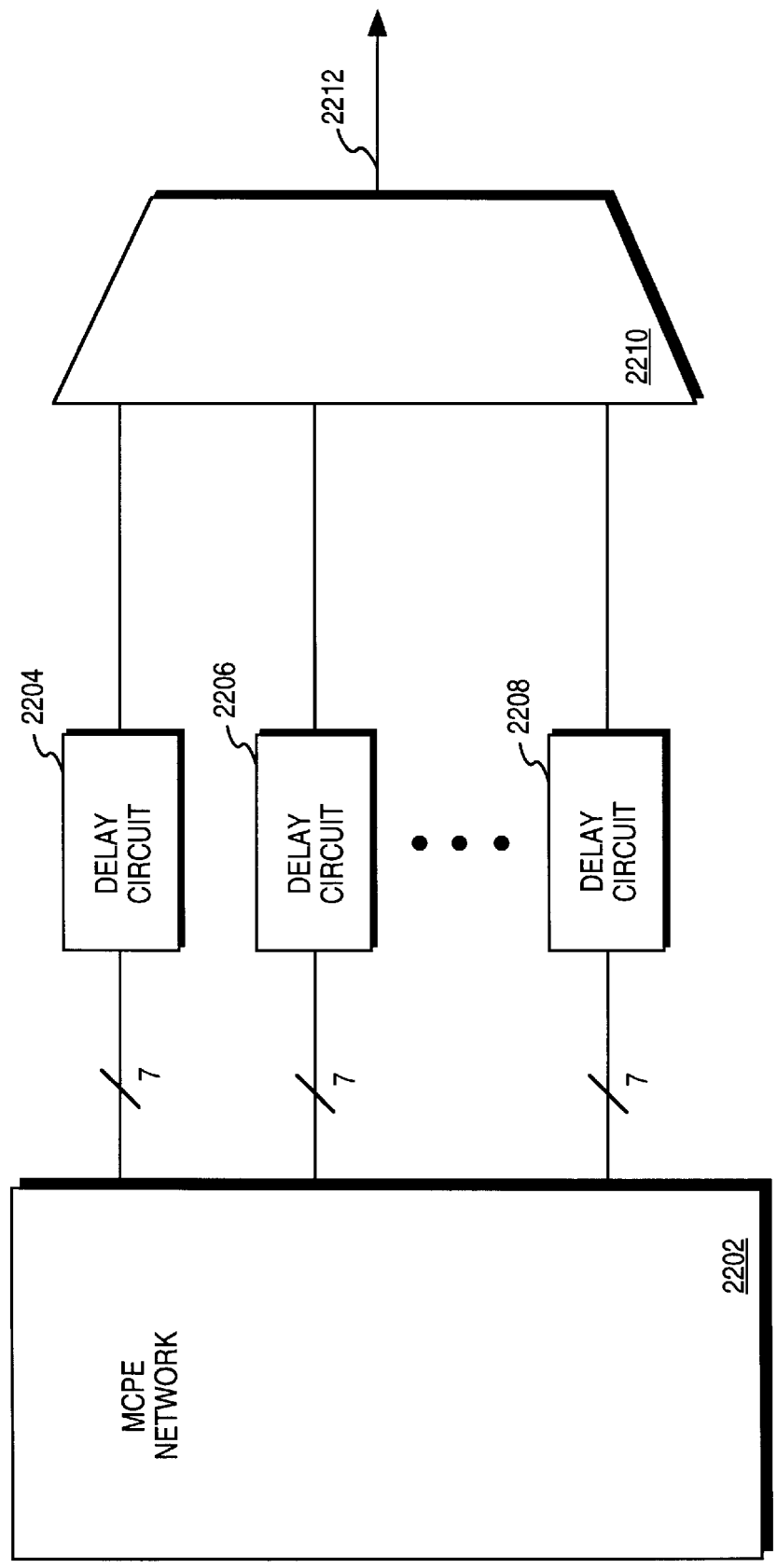
FIG. 11 is the MCPE networked array with delay circuits of one embodiment.

Pipeline delays can be programmed into the network structure as they are needed. These delays are separate from the networked array of MCPEs and provide data-dependent retiming under the control of the configuration memory context of a MCPE, but do not require an MCPE to implement the delay. In this way, processing elements are not wasted in order to provide timing delays. FIG. 11 is the MCPE networked array 2202 with delay circuits 2204–2208 of one embodiment. The subsets of the outputs of the MCPE array 2202 are coupled to the inputs of a number of delay circuits 2204–2208. In this configuration, a subset comprising seven MCPE outputs share each delay circuit, but the configuration is not so limited. The outputs of the delay circuits 2204–2208 are coupled to a multiplexer 2210 that multiplexes the delay circuit outputs to a system output 2212. In this manner, the pipeline delays can be selectively programmed for the output of each MCPE of the network of MCPEs. The configuration memory structure and local control described herein are shared between the MCPEs and the delay circuit structure.

Figure 12:
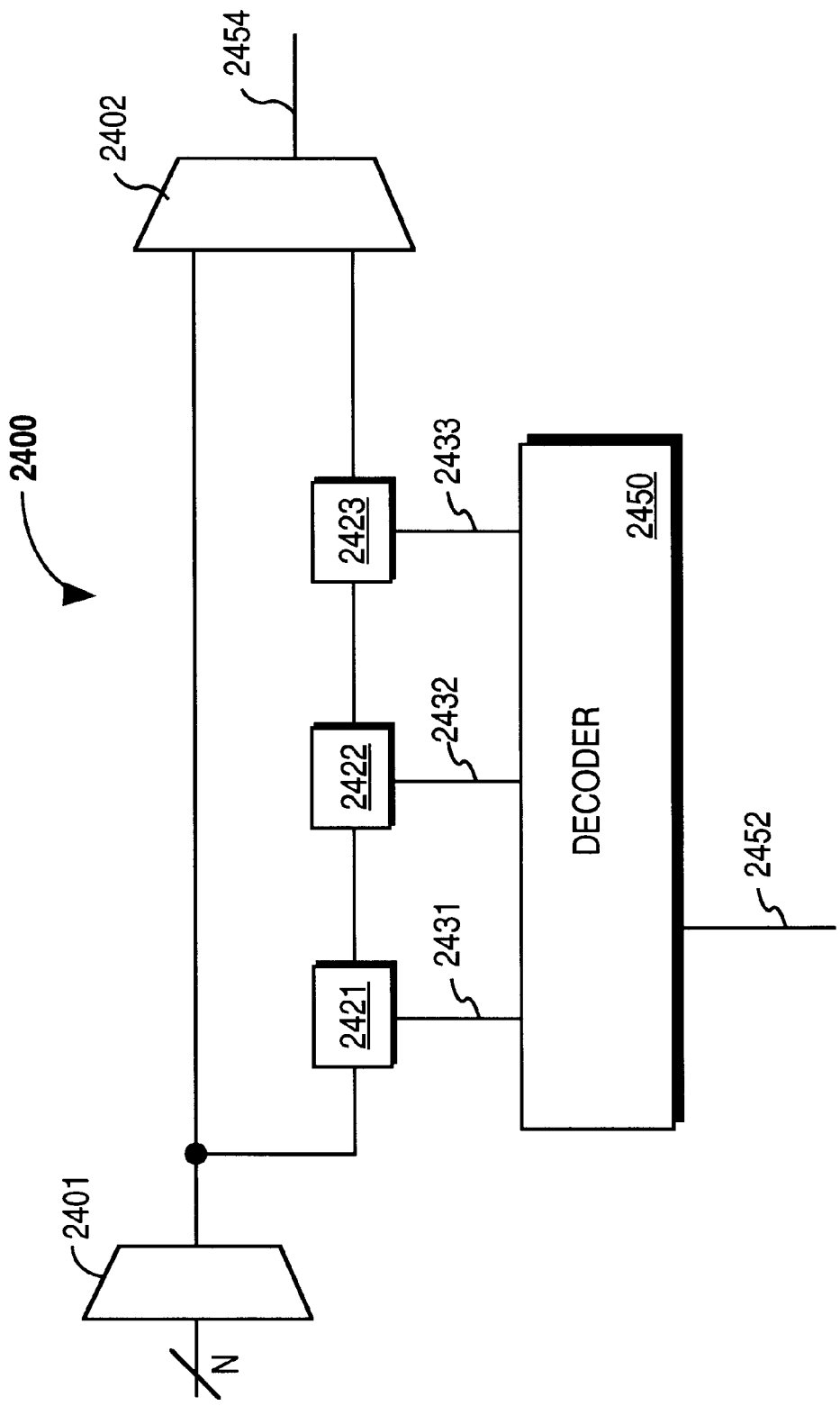
FIG. 12 is a delay circuit of one embodiment.

FIG. 12 is a delay circuit 2400 of one embodiment. This circuit comprises three delay latches 2421–2423, a decoder 2450, and two multiplexers 2401–2402, but is not so limited. Some number N of MCPE outputs of a network of MCPEs are multiplexed into the delay circuit 2400 using a first multiplexer 2401. The output of a MCPE selected by the first multiplexer 2401 is coupled to a second multiplexer 2402 and to the input of a first delay latch 2421. The output of the first delay latch 2421 is coupled to the input of a second delay latch 2422. The output of the second delay latch 2422 is coupled to the input of a third delay latch 2423. The output of the third delay latch 2423 is coupled to an input of the second multiplexer 2402. The output of the second multiplexer 2402 is the delay circuit output. A decoder 2450 selectively activates the delay latches 2421–2423 via lines 2431–2433, respectively, thereby providing the desired amount of delay. The decoder is coupled to receive via line 2452 at least one set of data representative of at least one configuration memory context of a MCPE and control latches 2421–2423 in response thereto. The MCPE having it's output coupled to the delay circuit 2400 by the first multiplexer 2402 may be the MCPE that is currently selectively coupled to the decoder 2450 via line 2452, but is not so limited. In an alternate embodiment, the MCPE receiving the output 2454 of the delay circuit 2400 from the second multiplexer 2402 may be the MCPE that is currently selectively coupled to the decoder 2450 via line 2452, but is not so limited.

Figure 13:
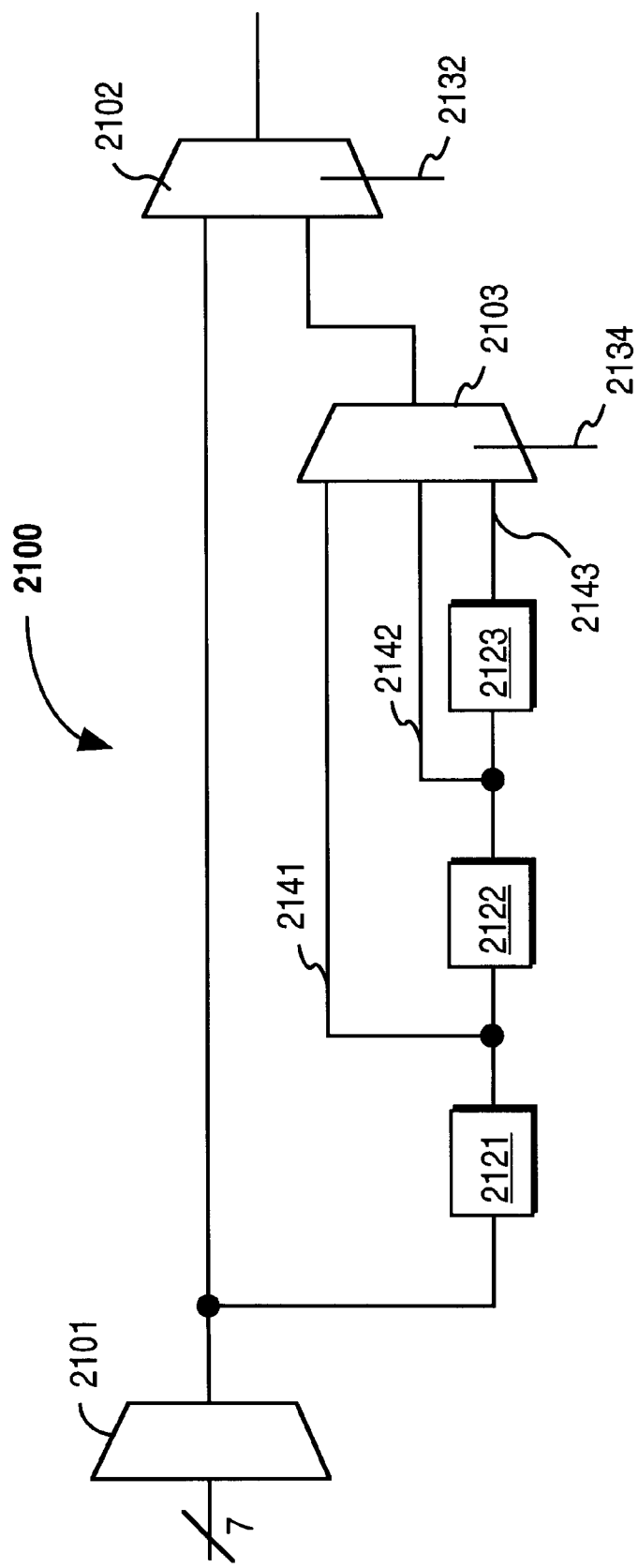
FIG. 13 is a delay circuit of an alternate embodiment.

FIG. 13 is a delay circuit 2100 of an alternate embodiment. This circuit comprises three delay registers 2121–2123 and three multiplexers 2101–2103, but is not so limited. Several outputs of a network of MCPEs are multiplexed into the delay circuit 2100 using a first multiplexer 2101. The output of a MCPE selected by the first multiplexer 2101 is coupled to a second multiplexer 2102 and the input of a first delay register 2121. The output of the first delay register 2121 is coupled to an input of a third multiplexer 2103 and the input of a second delay register 2122. The output of the second delay register 2122 is coupled to an input of the third multiplexer 2103 and the input of a third delay register 2123. The output of the third delay register 2123 is coupled to an input of the third multiplexer 2103. The output of the third multiplexer 2103 is coupled to an input of the second multiplexer 2102, and the output of the second multiplexer 2102 is the delay circuit output.

Each of the second and third multiplexers 2102 and 2103 are coupled to receive via lines 2132 and 2134, respectively, at least one set of data representative of at least one configuration memory context of a MCPE. Consequently, the MCPE coupled to control the second and third multiplexers 2102 and 2104 may be the MCPE that is currently selectively coupled to the delay circuit 2100 by multiplexer 2101, but is not so limited. The control bits provided to multiplexer 2102 cause multiplexer 2102 to select the undelayed output of multiplexer 2101 or the delayed output of multiplexer 2103. The control bits provided to multiplexer 2103 cause multiplexer 2103 to select a signal having a delay of a particular duration. When multiplexer 2103 is caused to select line 2141 then the delay duration is that provided by one delay register, delay register 2121. When multiplexer 2103 is caused to select line 2142 then the delay duration is that provided by two delay registers, delay registers 2121 and 2122. When multiplexer 2103 is caused to select line 2143 then the delay duration is that provided by three delay registers, delay registers 2121, 2122, and 2123.

Figure 14:
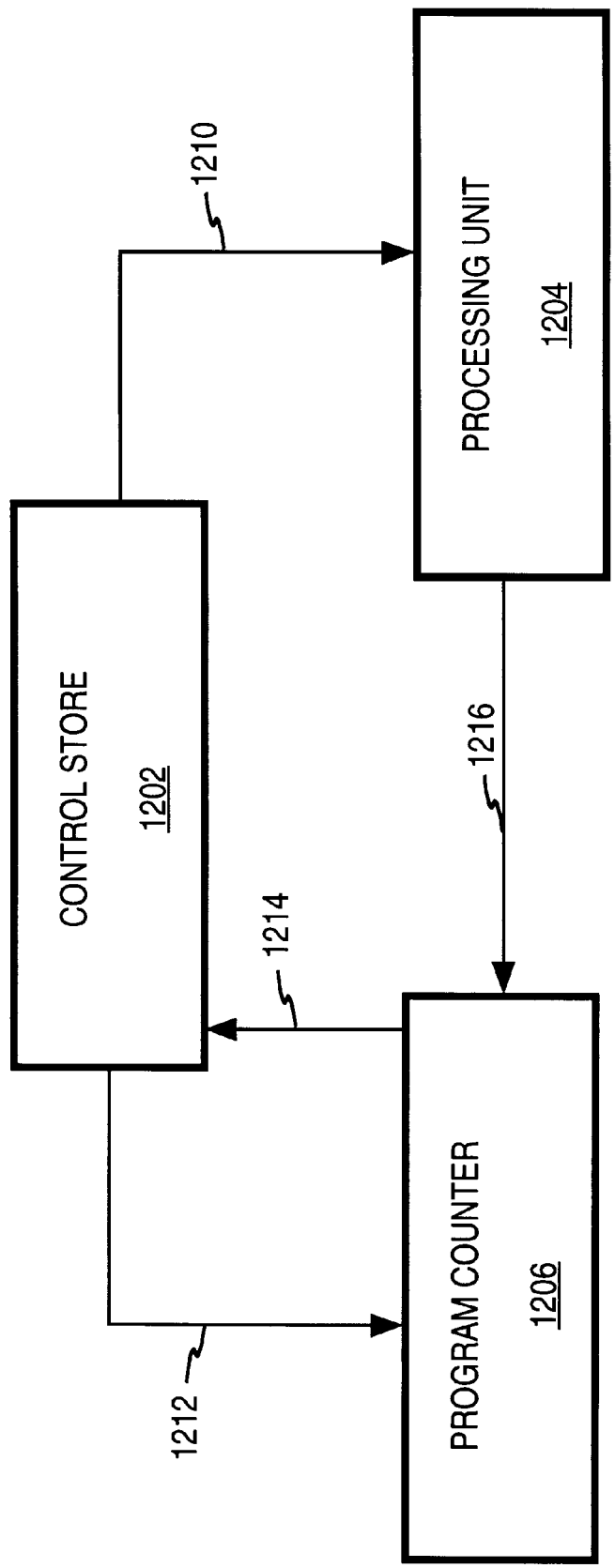
FIG. 14 is a processing element (PE) architecture which is a simplified version of the MCPE architecture of one embodiment.

The control logic of the MCPE of one embodiment is designed to allow data dependent changes in the MCPE operation. It does so by changing the MCPE configuration contexts which in turn change the MCPE functionality. In order to describe the use of configuration contexts, an architecture is described to which they apply. FIG. 14 is a processing element (PE) architecture which is a simplified version of the MCPE architecture of one embodiment. In this PE architecture, each PE has three input ports: the ALU port; the Data port; and the External control port. The control store 1202 is sending the processing unit 1204 microcode instructions 1210 and the program counter 1206 jump targets 1212. The control store 1202 takes the address of its next microcode instruction 1214 from the program counter 1206. The processing unit 1204 is taking the instructions 1210 from the control store 1202, as well as data not shown, and is performing the microcoded operations on that data. One of the results of this operation is the production of a control signal 1216 that is sent to the program counter 1206. The program counter 1206 performs one of two operations, depending on the value of the control signal from the processing unit 1204. It either adds one to the present value of the program counter 1206, or it loads the program counter 1206 with the value provided by the control store 1202.

The ports in each PE can either be set to a constant value or be set to receive their values from another PE. When the port is set to load the value from another PE it is said to be in a static mode. Each PE has a register file and the value presented at the ALU control port can instruct the PE to increment an element in its register file or load an element in its register file from the data port. The state of each port then is comprised by its port mode, which is constant or static. If the port mode is constant then its state also includes the constant value.

The PEs have multiple contexts. These contexts define the port state for each port. The PEs also have a finite state machine (FSM) that is described as a two index table that takes the current context as the first index and the control port as the second index. For this example, assume that there are two contexts, 0 and 1, and there are two values to the control signal 0 and 1.

Now considered is the creation of the program counter 1206 from the PEs. The definition of the context 0 for the program counter 1206 is that the ALU control port is set to a constant value such that the PE will increment its first register. The state of the data port is static and set to input the branch target output from the control store 1202. The state of the control port is static and set to input the control output from the processing unit 1204. The definition of context 1 is that the ALU control port is set to a constant value such that the PE will load its first register with the value of the data port. The state of the data port is static and set to input the branch target output from the control store 1202. The state of the control port is static and set to input the control output from the processing unit 1204. In all contexts the unit is sending the value of its first register to the control store as its next address.

Now considered is the operation of this PE unit. The PE is placed into context 0 upon receiving a 0 control signal from the processing unit 1204. In this context it increments its first register so that the address of the next microcode instruction is the address following the one of the present instruction. When the PE receives a 1 control signal from the processing unit it is placed in context 1. In this context it loads its first register with the value received on the data port. This PE is therefore using the context and the FSM to vary its function at run time and thereby perform a relatively complex function.

Figure 15:
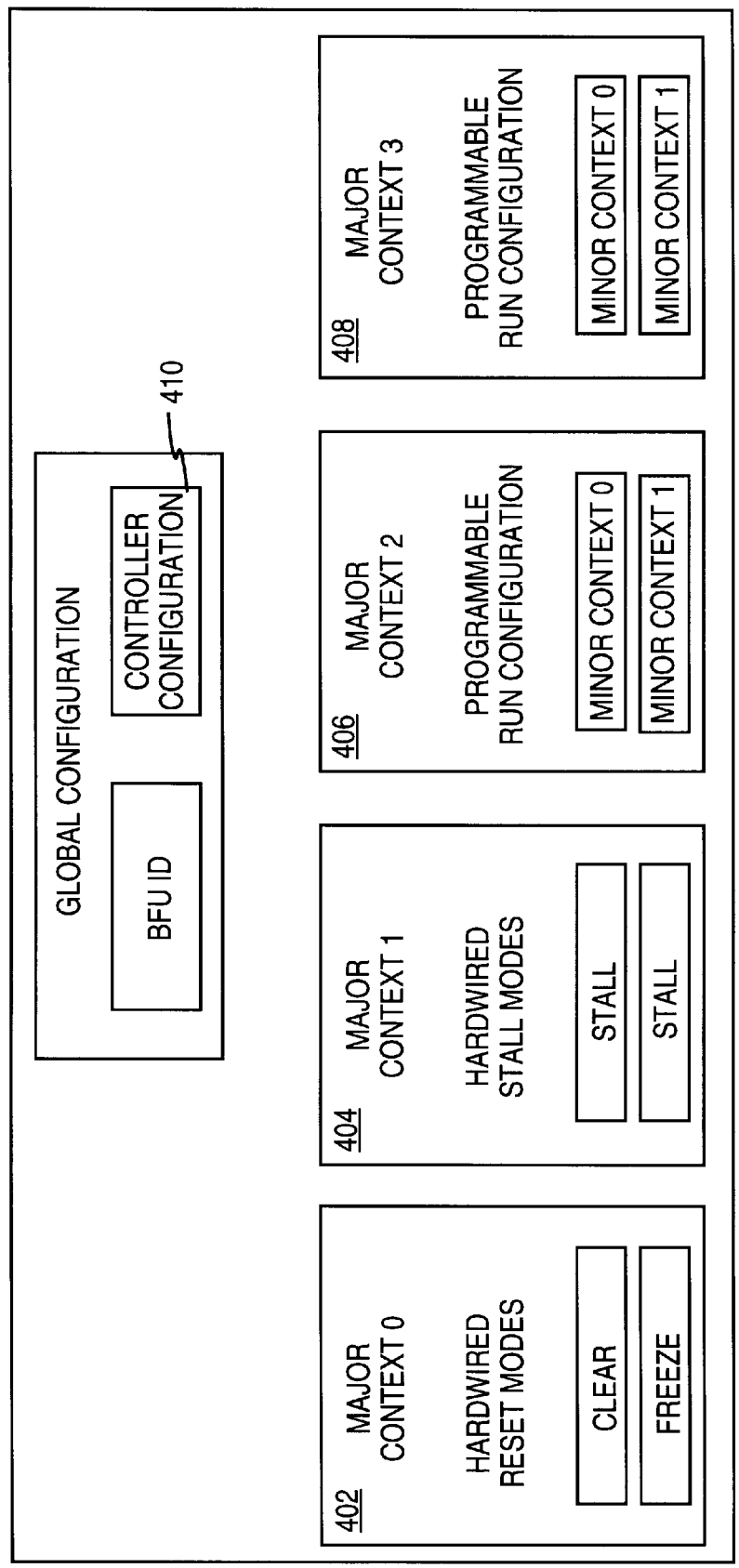
FIG. 15 is the MCPE configuration memory structure of one embodiment.

FIG. 15 is the MCPE configuration memory structure of one embodiment. Each MCPE has four major contexts 402–408 of configuration memory. Each context contains a complete set of data to fully describe the operation of the MCPE, including the local network switching. In one embodiment two of the contexts are hardwired and two are programmable. Each of these contexts includes two independently writable minor contexts. In the programmable major contexts the minor contexts are a duplication of part of the MCPE configuration consisting primarily of the port configurations. In the hardwired major contexts the minor contexts may change more than just the port configurations. The switching of these minor contexts is also controlled by the configuration control. The minor contexts are identical in structure but contain different run-time configurations. This allows a greater degree of configuration flexibility because it is possible to dynamically swap some parts of the configuration without requiring memories to store extra major contexts. These minor contexts allow extra flexibility for important parts of the configuration while saving the extra memory available for those parts that don't need to be as flexible. A configuration controller 410 finite state machine (FSM) determines which context is active on each cycle. Furthermore, a global configuration network can force the FSM to change contexts.

The first two major contexts (0 and 1) may be hardwired, or set during the design of the chip, although they are not so limited. Major context 0 is a reset state that serves two primary roles depending on the minor context. Major context 1 is a local stall mode. When a MCPE is placed into major context 1 it continues to use the configuration setting of the last non-context 1 cycle and all internal registers are frozen. This mode allows running programs to stall as a freeze state in which no operations occur but allows programming and scan chain readout, for debugging, to occur.

Minor context 0 is a clear mode. Minor context 0 resets all MCPE registers to zero, and serves as the primary reset mode of the chip. Minor context 0 also freezes the MCPE but leaves the main memory active to be read and written over by the configuration network.

Minor context 1 is a freeze mode. In this mode the internal MCPE registers are frozen while holding their last stored value; this includes the finite state machine state register. This mode can be used as a way to turn off MCPE's that are not in use or as a reset state. Minor context 1 is useful to avoid unnecessary power consumption in unused MCPEs because the memory enable is turned off during this mode.

Major contexts 2 and 3 are programmable contexts for user defined operations. In addition to the four major contexts the MCPE contains some configurations that do not switch under the control of the configuration controller. These include the MCPE's identification number and the configuration for the controller itself.

Figure 16:
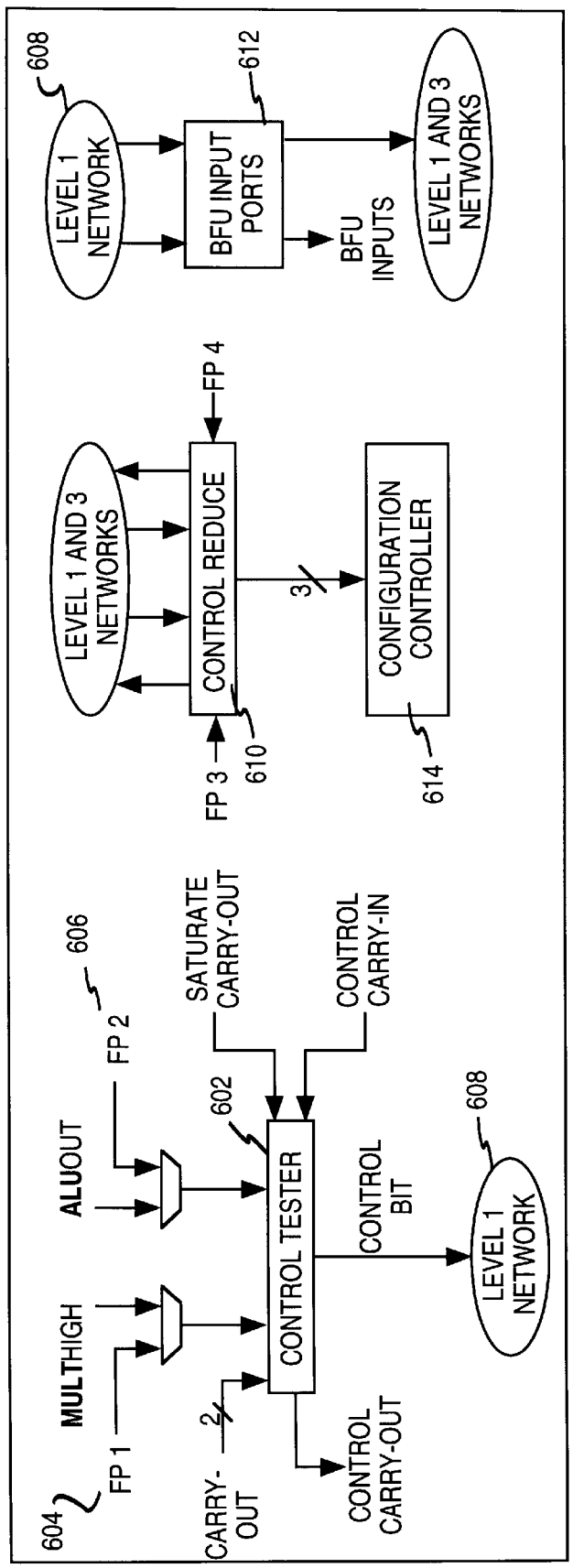
FIG. 16 shows the major components of the MCPE control logic structure of one embodiment.

FIG. 16 shows the major components of the MCPE control logic structure of one embodiment. The Control Tester 602 takes the output of the ALU for two bytes from floating ports 604 and 606, plus the left and right carryout bits, and performs a configurable test on them. The result is one bit indicating that the comparison matched. This bit is referred to as the control bit. This Control Tester serves two main purposes. First it acts as a programmable condition code generator testing the ALU output for any condition that the application needs to test for. Secondly, since these control bits can be grouped and sent out across the level 2 and 3 networks, this unit can be used to perform a second or later stage reduction on a set of control bits/data generated by other MCPE's.

The level 1 network 608 carries the control bits. As previously discussed, the level 1 network 608 consists of direct point-to-point communications between every MCPE and it's 12 nearest neighbors. Thus, each MCPE will receive 13 control bits (12 neighbors and it's own) from the level 1 network. These 13 control bits are fed into the Control Reduce block 610 and the BFU input ports 612. The Control Reduce block 610 allows the control information to rapidly effect neighboring MCPEs. The MCPE input ports allow the application to send the control data across the normal network wires so they can cover long distances. In addition the control bits can be fed into MCPEs so they can be manipulated as normal data.

The Control Reduce block 610 performs a simple selection on either the control words coming from the level 1 control network, the level 3 network, or two of the floating ports. The selection control is part of the MCPE configuration. The Control Reduce block 610 selection results in the output of five bits. Two of the output bits are fed into the MCPE configuration controller 614. One output bit is made available to the level 1 network, and one output bit is made available to the level 3 network.

The MCPE configuration controller 614 selects on a cycle-by-cycle basis which context, major or minor, will control the MCPE's activities. The controller consists of a finite state machine (FSM) that is an active controller and not just a lookup table. The FSM allows a combination of local and global control over time that changes. This means that an application may run for a period based on the local control of the FSM while receiving global control signals that reconfigure the MCPE, or a block of MCPEs, to perform different functions during the next clock cycle. The FSM provides for local configuration and control by locally maintaining a current configuration context for control of the MCPE. The FSM provides for global configuration and control by providing the ability to multiplex and change between different configuration contexts of the MCPE on each different clock cycle in response to signals broadcasted over a network. This configuration and control of the MCPE is powerful because it allows an MCPE to maintain control during each clock cycle based on a locally maintained configuration context while providing for concurrent global on-the-fly reconfiguration of each MCPE. This architecture significantly changes the area impact and characterization of an MCPE array while increasing the efficiency of the array without wasting other MCPEs to perform the configuration and control functions.

Figure 17:
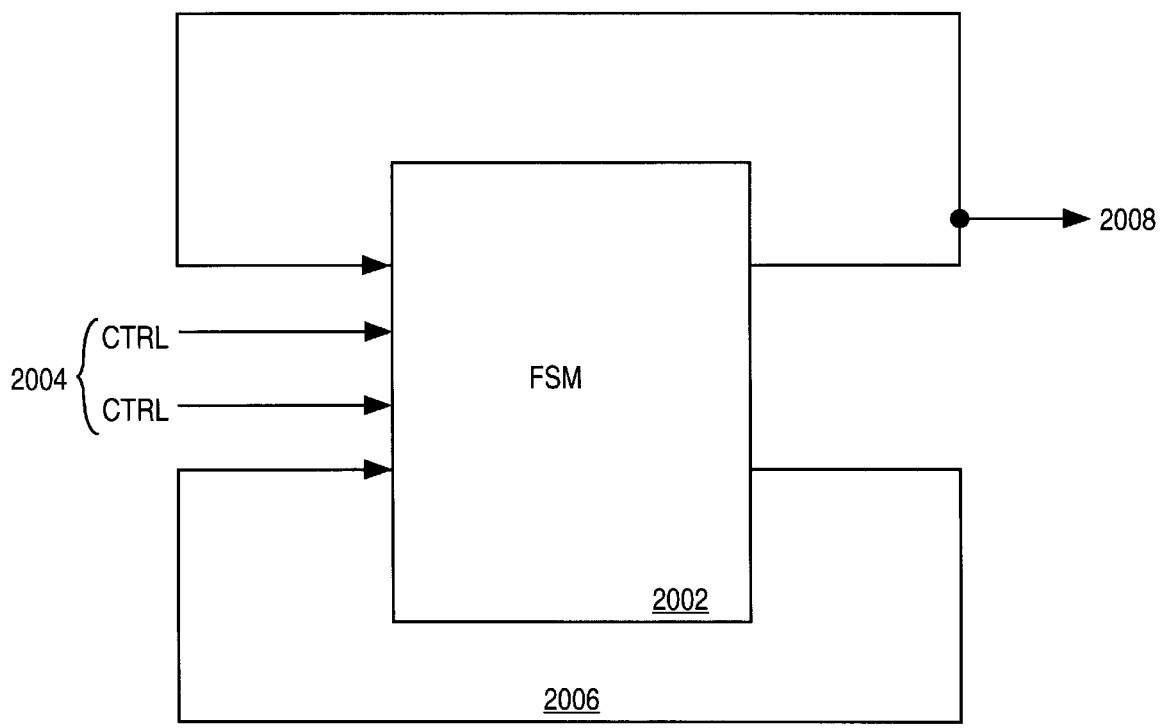
FIG. 17 is the FSM of the MCPE configuration controller of one embodiment.

FIG. 17 is the FSM of the MCPE configuration controller of one embodiment. In controlling the functioning of the MCPE, control information 2004 is received by the FSM 2002 in the form of state information from at least one surrounding MCPE in the networked array. This control information is in the form of two bits received from the Control Reduce block of the MCPE control logic structure. In one embodiment, the FSM also has three state bits that directly control the major and minor configuration contexts for the particular MCPE. The FSM maintains the data of the current MCPE configuration by using a feedback path 2006 to feed back the current configuration state of the MCPE of the most recent clock cycle. The feedback path 2006 is not limited to a single path. The FSM selects one of the available configuration memory contexts for use by the corresponding MCPE during the next clock cycle in response to the received state information from the surrounding MCPEs and the current configuration data. This selection is output from the FSM in the form of a configuration control signal 2008. The selection of a configuration memory context for use during the next clock cycle occurs, in one embodiment, during the execution of the configuration memory context selected for the current clock cycle.

Figure 18:
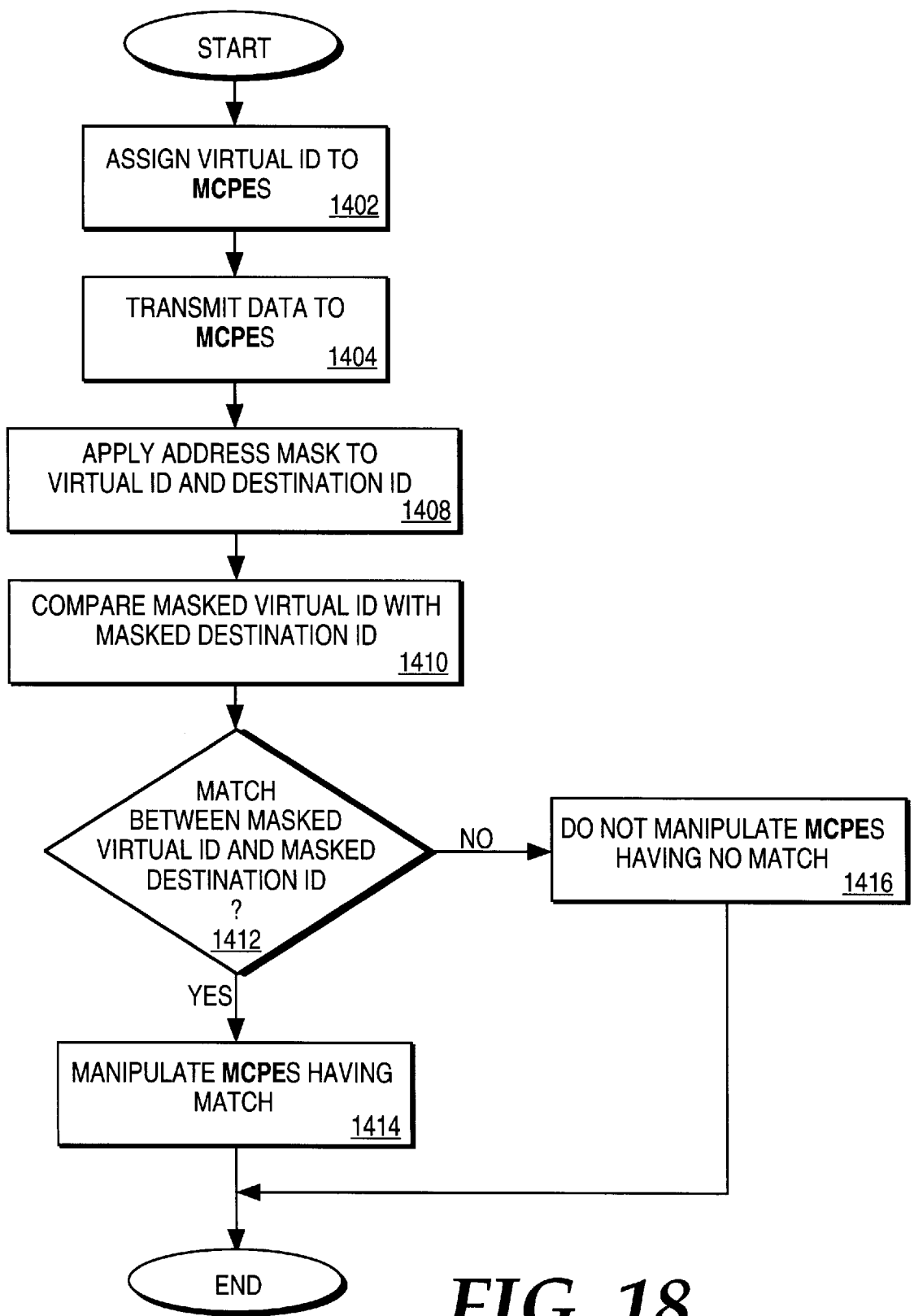
FIG. 18 is a flowchart for manipulating a networked array of MCPEs in one embodiment.

FIG. 18 is a flowchart for manipulating a networked array of MCPEs in one embodiment. Each MCPE of the networked array is assigned a physical identification which, in one embodiment, is assigned at the time of network development. This physical identification may be based on the MCPE's physical location in the networked array. Operation begins at block 1402, at which a virtual identification is assigned to each of the MCPEs of the array. The physical identification is used to address the MCPEs for reprogramming of the virtual identification because the physical identification is accessible to the programmer. The assigned virtual identification may be initialized to be the same as the physical identification. Data is transmitted to the MCPE array using the broadcast, or configuration, network, at block 1404. The transmitted data comprises an address mask, a destination identification, MCPE configuration data, and MCPE control data. The transmitted data also may be used in selecting between the use of the physical identification and the virtual identification in selecting MCPEs for manipulation. Furthermore, the transmitted data may be used to change the virtual identification of the MCPEs. The transmitted data in one embodiment is transmitted from another MCPE. In an alternate embodiment, the transmitted data is transmitted from an input/output device. In another alternate embodiment, the transmitted data is transmitted from an MCPE configuration controller. The transmitted data may also be transmitted from multiple sources at the same time.

The address mask is applied, at block 1408, to the virtual identification of each MCPE and to the transmitted destination identification. The masked virtual identification of each MCPE is compared to the masked destination identification, at block 1410, using a comparison circuit. When a match is determined between the masked virtual identification of a MCPE and the masked destination identification, at block 1412, the MCPE is manipulated in response to the transmitted data, at block 1414. The manipulation is performed using a manipulation circuit. When no match is determined between the masked virtual identification of a MCPE, at block 1412, the MCPE is not manipulated in response to transmitted data, at block 1416. In one embodiment, a MCPE comprises the comparison circuit and the manipulation circuit.

Figure 19:
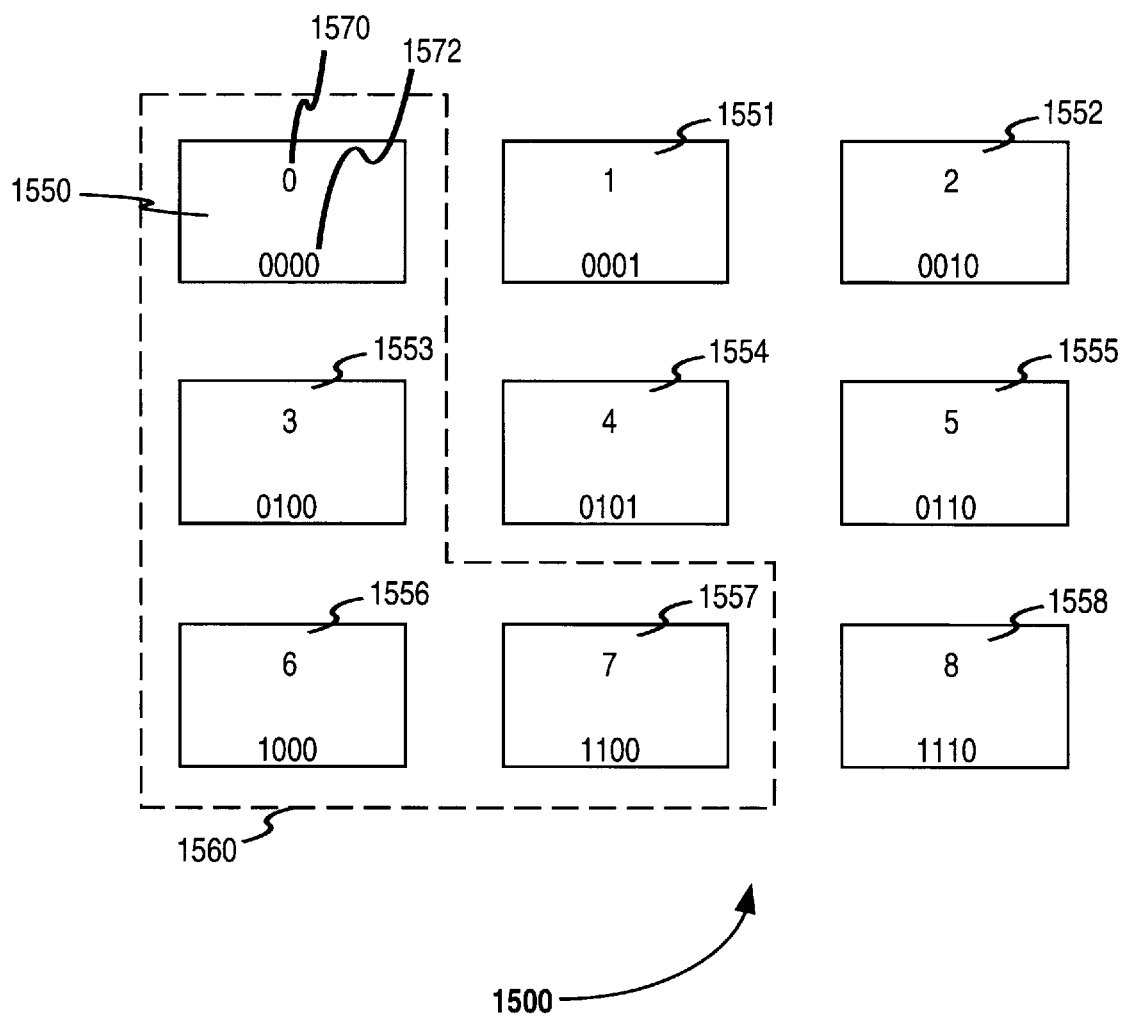
FIG. 19 shows the selection of MCPEs using an address mask in one embodiment.

FIG. 19 shows the selection of MCPEs using an address mask in one embodiment. The selection of MCPEs for configuration and control, as previously discussed, is determined by applying a transmitted mask to either the physical address 1570 or the virtual address 1572 of the MCPEs 1550–1558. The masked address is then compared to a masked destination identification. For example, MCPEs 1550–1558 have physical addresses 0–8, respectively. MCPE 1550 has virtual address 0000. MCPE 1551 has virtual address 0001. MCPE 1552 has virtual address 0010. MCPE 1553 has virtual address 0100. MCPE 1554 has virtual address 0101. MCPE 1555 has virtual address 0110. MCPE 1556 has virtual address 1000. MCPE 1557 has virtual address 1100. MCPE 1558 has virtual address 1110.

In this example, the virtual address 1572 will be used to select the MCPEs, so the mask will be applied to the virtual address 1572. The mask is used to identify the significant bits of the virtual address 1572 that are to be compared against the significant bits of the masked destination identification in selecting the MCPEs. When mask (0011) is transmitted, the third and fourth bits of the virtual address 1572 are identified as significant by this mask. This mask also identifies the third and fourth bits of the destination identification as significant. Therefore, any MCPE having the third and fourth bits of the virtual address matching the third and fourth bits of the destination identification is selected. In this example, when the mask (0011) is applied to the virtual address and applied to a destination identification in which the third and fourth bits are both zero, then MCPEs 1550, 1553, 1556, and 1557 are selected. MCPEs 1550, 1553, 1556, and 1557 define a region 1560 and execute a particular function within the networked array 1500.

When the transmitted data comprises configuration data, manipulation of the selected MCPEs may comprise programming the selected MCPEs with a number of configuration memory contexts. This programming may be accomplished simultaneously with the execution of a present function by the MCPE to be programmed. As the address masking selection scheme results in the selection of different MCPEs or groups of MCPEs in different regions of a chip, then a first group of MCPEs located in a particular region of the chip may be selectively programmed with a first configuration while other groups of MCPEs located in different regions of the same chip may be selectively programmed with configurations that are different from the first configuration and different from each other. The groups of MCPEs of the different regions may function independently of each other in one embodiment, and different regions may overlap in that multiple regions may use the same MCPEs. The groups of MCPEs have arbitrary shapes as defined by the physical location of the particular MCPEs required to carry out a function.

When the transmitted data comprises control data, manipulation of the selected MCPEs comprises selecting MCPE configuration memory contexts to control the functioning of the MCPEs. As the address masking selection scheme results in the selection of different MCPEs or groups of MCPEs in different regions of a chip, then a first group of MCPEs located in a particular area of the chip may have a first configuration memory context selected while other groups of MCPEs located in different areas of the same chip may have configuration memory contexts selected that are different from the first configuration memory context and different from each other.

When the transmitted data comprises configuration and control data, manipulation of the selected MCPEs may comprise programming the selected MCPEs of one region of the networked array with one group of configuration memory contexts. Moreover, the manipulation of the selected MCPEs also comprises selecting a different group of configuration memory contexts to control the functioning of other groups of MCPEs located in different areas of the same chip. The regions defined by the different groups of MCPEs may overlap in one embodiment.

FIGS. 20–23 illustrate the use of the address masking selection scheme in the selection and reconfiguration of different MCPEs or groups of MCPEs in different regions of a chip to perform different functions in one embodiment. An embodiment of the present invention can be configured in one of these illustrated configurations, but is not so limited to these configurations. A different configuration may be selected for each MCPE on each different clock cycle.

Figure 20:
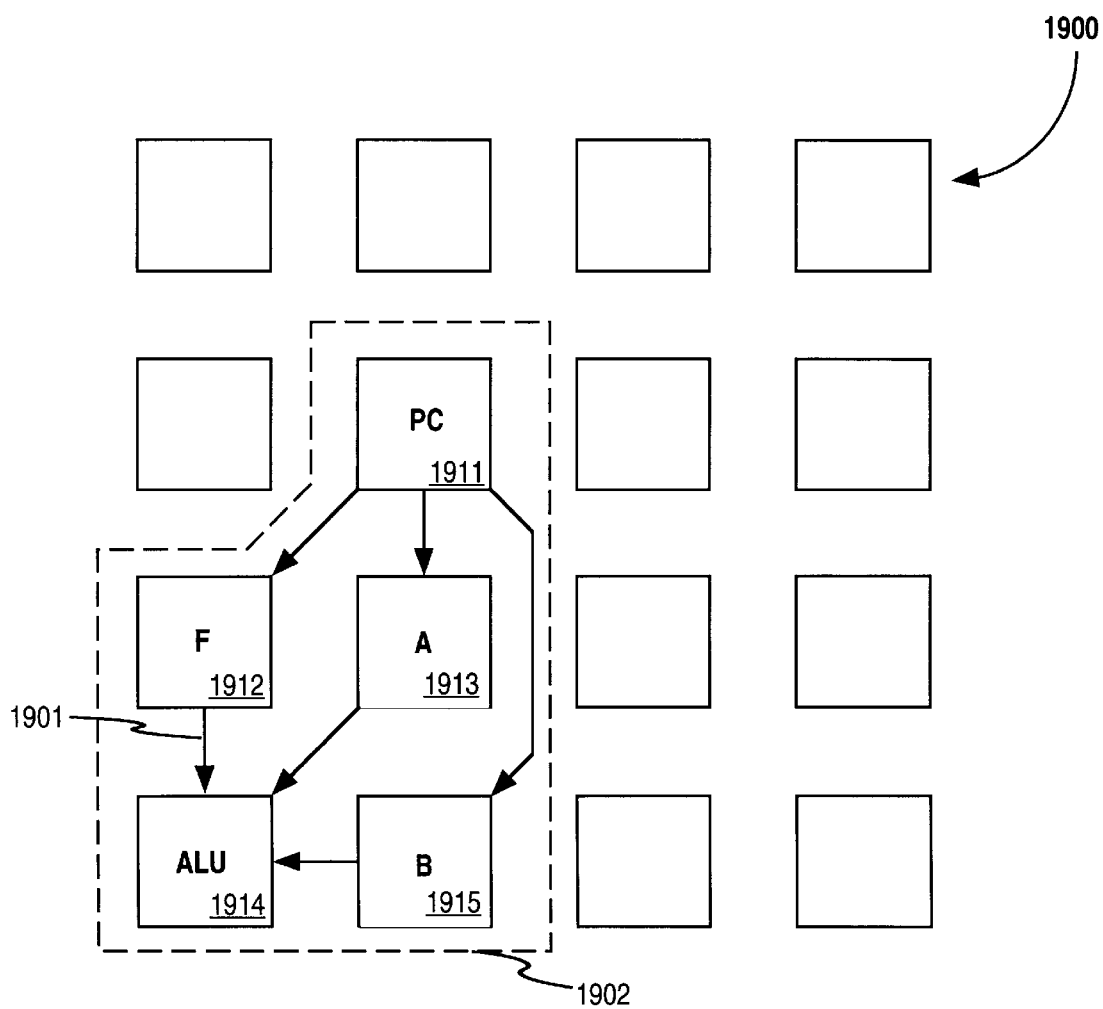
FIG. 20 illustrates an 8-bit processor configuration of a reconfigurable processing device which has been constructed and programmed according to one embodiment.

FIG. 20 illustrates an 8-bit processor configuration of a reconfigurable processing device which has been constructed and programmed according to one embodiment. The two dimensional array of MCPEs 1900 are located in a programmable interconnect 1901. Five of the MCPEs 1911–1915 and the portion of the reconfigurable interconnect connecting the MCPEs have been configured to operate as an 8-bit microprocessor 1902. One of the MCPEs 1914 denoted ALU utilizes logic resources to perform the logic operations of the 8-bit microprocessor 1902 and utilizes memory resources as a data store and/or extended register file. Another MCPE 1912 operates as a function store that controls the successive logic operations performed by the logic resources of the ALU. Two additional MCPEs 1913 and 1915 operate as further instruction stores that control the addressing of the memory resources of the ALU. A final MCPE 1911 operates as a program counter for the various instruction MCPEs 1912, 1913, and 1915.

Figure 21:
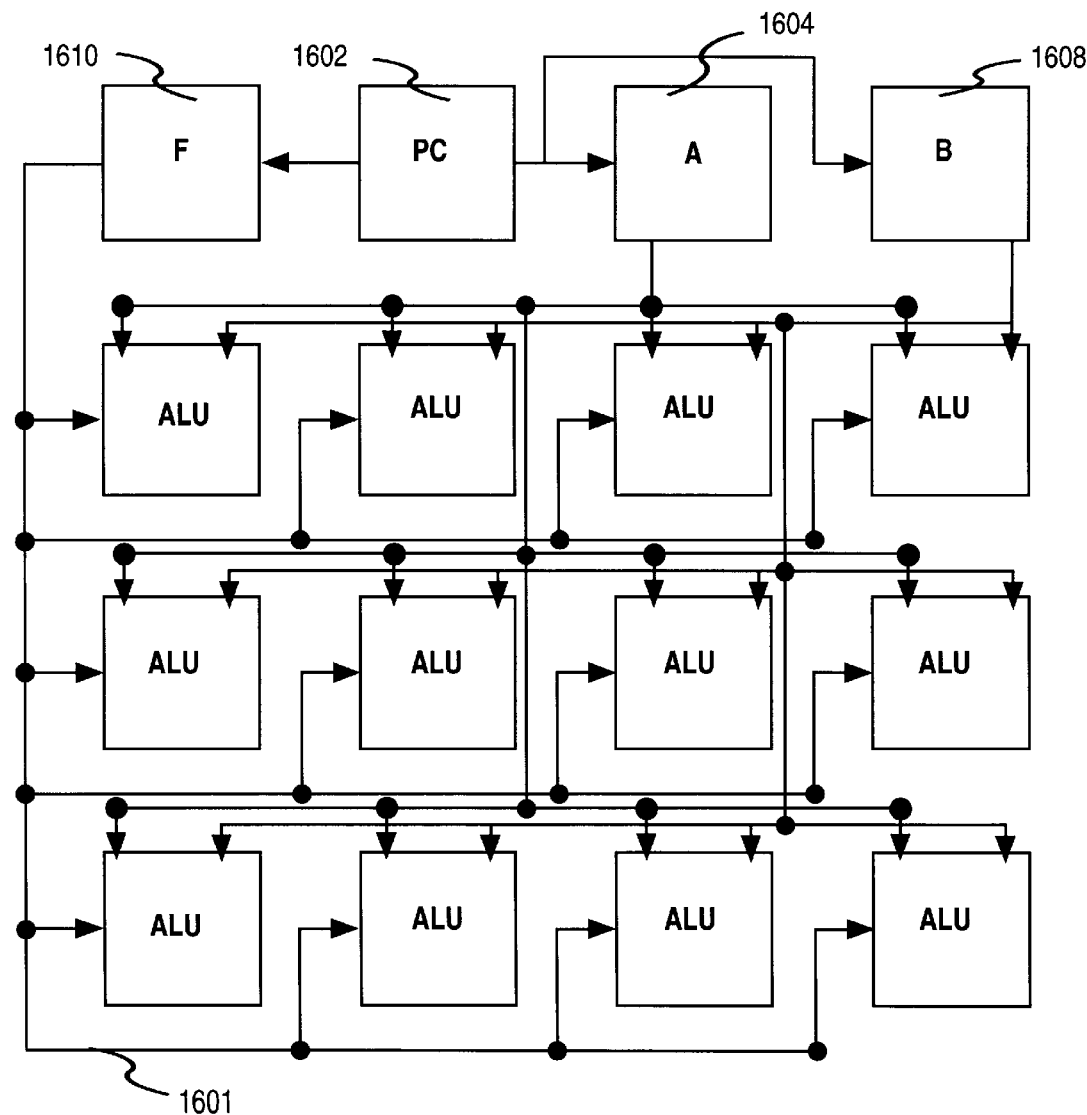
FIG. 21 illustrates a single instruction multiple data system configuration of a reconfigurable processing device of one embodiment.

FIG. 21 illustrates a single instruction multiple data system configuration of a reconfigurable processing device of one embodiment. The functions of the program counter 1602 and instruction stores 1604, 1608 and 1610 have been assigned to different MCPEs, but the ALU function has been replicated into 12 MCPEs. Each of the ALUs is connected via the reconfigurable interconnect 1601 to operate on globally broadcast instructions from the instruction stores 1604, 1608, and 1610. These same operations are performed by each of these ALUs or common instructions may be broadcast on a row-by-row basis.

Figure 22:
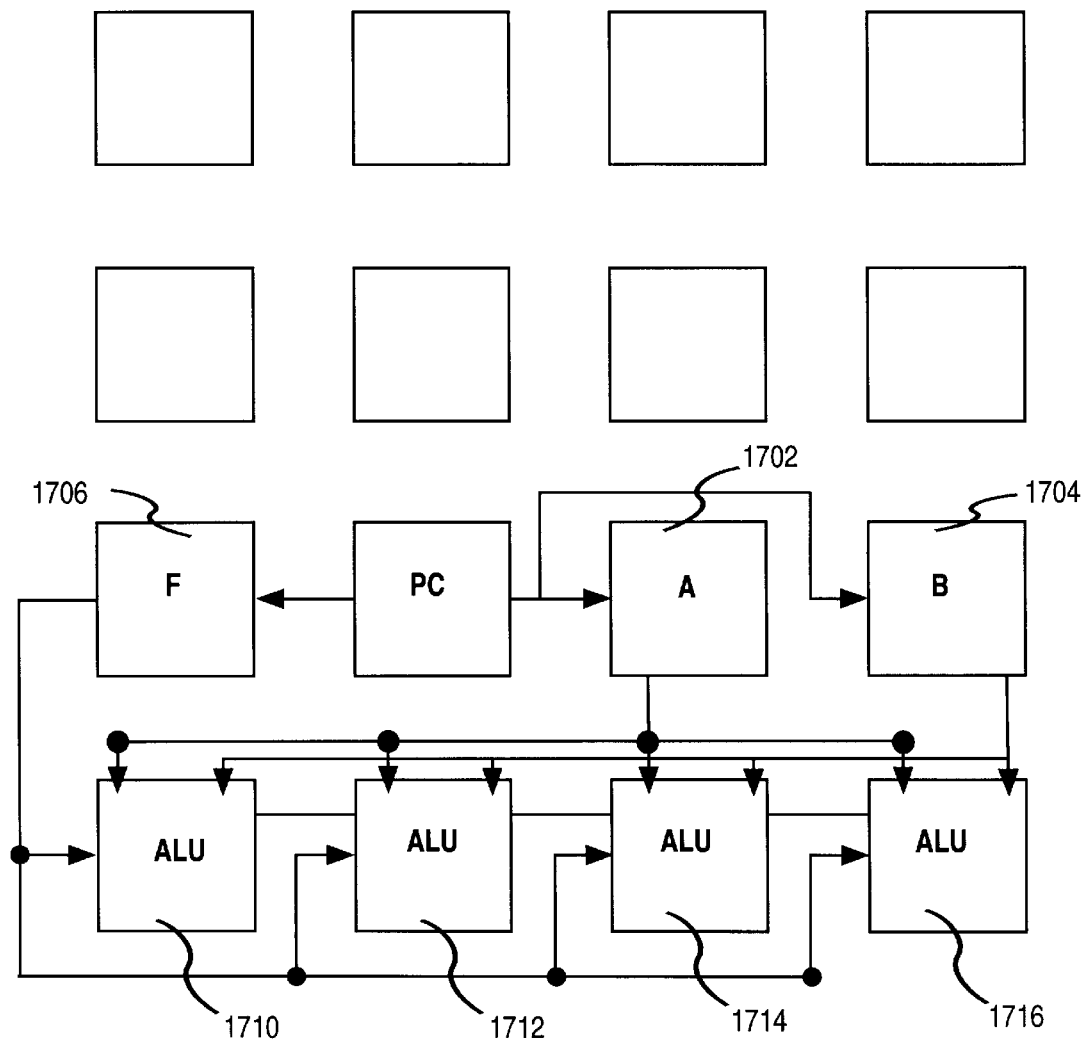
FIG. 22 illustrates a 32-bit processor configuration of a reconfigurable processing device which has been constructed and programmed according to one embodiment.

FIG. 22 illustrates a 32-bit processor configuration of a reconfigurable processing device which has been constructed and programmed according to one embodiment. This configuration allows for wider data paths in a processing device. This 32-bit microprocessor configured device has instruction stores 1702, 1704, and 1706 and a program counter 1708. Four MCPEs 1710–1716 have been assigned an ALU operation, and the ALUs are chained together to act as a single 32-bit wide microprocessor in which the interconnect 1701 supports carry in and carry out operations between the ALUs.

Figure 23:
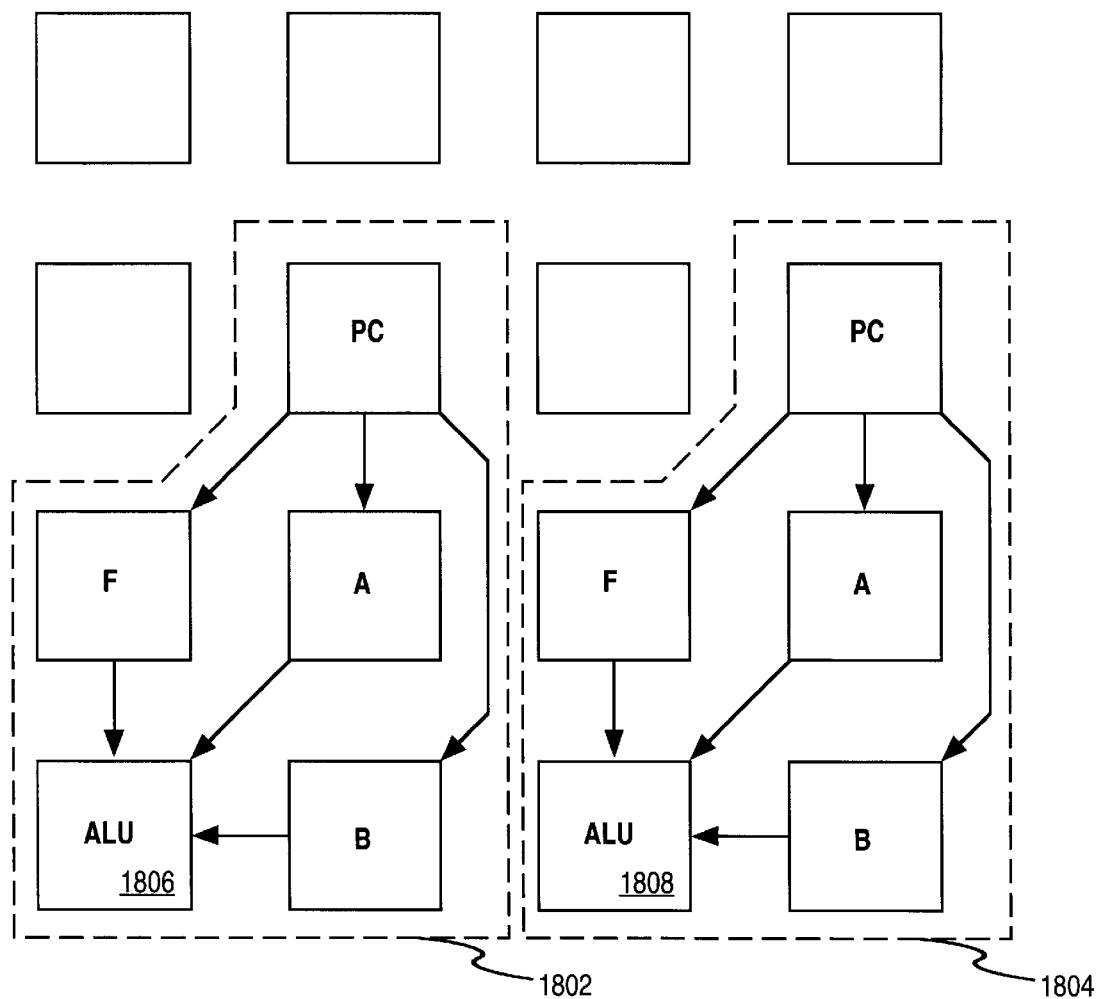
FIG. 23 illustrates a multiple instruction multiple data system configuration of a reconfigurable processing device of one embodiment.

FIG. 23 illustrates a multiple instruction multiple data system configuration of a reconfigurable processing device of one embodiment. The 8-bit microprocessor configuration 1802 of FIG. 20 is replicated into an adjacent set of MCPEs 1804 to accommodate multiple independent processing units within the same device. Furthermore, wider data paths could also be accommodated by chaining the ALUs 1806 and 1808 of each processor 1802 and 1804, respectively, together.

Thus, a method and an apparatus for retiming in a network of multiple context processing elements have been provided. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for controlling a first multiple context processing element, wherein the first multiple context processing element is configured to store a plurality of configuration memory contexts, the method comprising the steps of:

receiving state information from at least one multiple context processing element, wherein the state information is representative of at least one configuration memory context of the at least one multiple context processing element;

maintaining data of a current configuration of the first multiple context processing element;

selecting one of a plurality of configuration memory contexts in response to the received state information and the data of a current configuration, the selected one of a plurality of configuration memory contexts controlling the first multiple context processing element.

2. The method of claim 1, further comprising the step of generating at least one configuration control signal in response to the state information and the data of a current configuration.

3. The method of claim 1, wherein the state information comprises at least one bit received over a multiple level network from at least one multiple context processing element, the at least one bit representative of at least one configuration memory context of the at least one multiple context processing element.

4. The method of claim 1, further comprising the step of the first multiple context processing element providing state information to at least one multiple context processing element, the state information used in the selection of a plurality of configuration memory contexts to control the at least one multiple context processing element.

5. The method of claim 1, further comprising the steps of:

assigning a physical identification and a virtual identification to the first multiple context processing element;

transmitting data comprising an address mask;

comparing the virtual identification of the first multiple context processing element masked with the address mask to a masked destination identification; and performing the step of selecting one of a plurality of configuration memory contexts in the first multiple context processing element in response to the transmitted data when the masked virtual identification of the first multiple context processing element matches the masked destination identification.

6. The method of claim 5, further comprising the step of programming the first multiple context processing element with the plurality of configuration memory contexts during the execution of a present function by the first multiple context processing element.

7. The method of claim 1, wherein each multiple context processing element comprises a plurality of configuration memory contexts, wherein at least one of the plurality of configuration memory contexts is a major context and at least one of the plurality of configuration memory contexts is a minor context.

8. The method of claim 7, wherein at least one of the plurality of configuration memory contexts is hardwired and at least one of the plurality of configuration memory contexts is programmable.

9. The method of claim 7, wherein the plurality of configuration memory contexts comprise at least one reset mode and at least one stall mode.

10. The method of claim 7, wherein the plurality of configuration memory contexts comprise at least one clear mode and at least one freeze mode.

11. The method of claim 1, further comprising the step of selecting a first configuration memory context in response to the received state information, the selection occurring during the execution of a second configuration memory context in the first multiple context processing element.

12. The method of claim 1, further comprising the step of receiving the state information from at least one logic circuit.

13. In a first multiple context processing element in a network, wherein the first multiple context processing element is configured to store a plurality of configuration memory contexts, an apparatus comprising:

at least one input configured to receive state information from at least one multiple context processing element and data of a current configuration of the first multiple context processing element, wherein the state information is representative of at least one configuration memory context of the at least one multiple context processing element; and a controller coupled to the at least one input, the controller configured to select one of a plurality of configuration memory contexts in response to the state information and the data of a current configuration.

14. The apparatus of claim 13, wherein the at least one input comprises at least one logic circuit configured to receive state information from a plurality of multiple context processing elements.

15. The apparatus of claim 14, wherein the at least one input further comprises a second logic circuit configured to receive at least one control bit from the first logic circuit and configured to receive data of a current configuration of the first multiple context processing element.

16. The apparatus of claim 13, wherein configuration data is maintained from at least one previous state of the multiple context processing element.

17. The apparatus of claim 13, wherein the first multiple context processing element and the plurality of multiple context processing elements are programmed with at least one of a plurality of configuration memory contexts.

18. The apparatus of claim 13, wherein the apparatus operates in response to:

an assignment of a physical identification and a virtual identification to the first multiple context processing element;

a transmission of data to the first multiple context processing element, the data comprising an address mask;

a comparison of the virtual identification of a multiple context processing element masked with the address mask to a masked destination identification; and a selection of one of a plurality of configuration memory contexts when the masked virtual identification of the multiple context processing element matches the masked destination identification.

19. The apparatus of claim 18, wherein the apparatus operates in response to programming a plurality of configuration memory contexts.

20. The apparatus of claim 13, wherein the plurality of configuration memory contexts are selected during the execution of a present function by the first multiple context processing element.

21. The apparatus of claim 13, wherein each of the plurality of configuration memory contexts comprises data to fully control the operation of the first multiple context processing element.

22. The apparatus of claim 13, wherein at least one level of a network carries the state information between the plurality of multiple context processing elements, the at least one level of the network comprising direct connections between the first multiple context processing element and a plurality of multiple context processing elements.

23. A system comprising a processor, the processor configured to:

receive state information over a network from at least one of a plurality of multiple context processing elements, wherein the at least one of a plurality of multiple context processing elements is configured to store a plurality of configuration memory contexts, wherein the state information is representative of at least one configuration memory context of the at least one of a plurality of multiple context processing elements;

maintain data of a current configuration of a first multiple context processing element;

select one of a plurality of configuration memory contexts in response to the received state information and the data of a current configuration, the selected one of a plurality of configuration memory contexts controlling the first multiple context processing element.

24. The system of claim 23, wherein the processor is further configured to generate at least one configuration control signal in response to the state information and the data of a current configuration.

25. The system of claim 23, wherein the processor is further configured to program the first multiple context processing element with at least one of a plurality of configuration memory contexts during the execution of a present function.

26. The system of claim 23, wherein the processor is further configured to:

receive an assignment of a physical identification and a virtual identification to the first multiple context processing elements;

receive data comprising an address mask;

compare the virtual identification of the first multiple context processing element masked with the address mask to a masked destination identification; and perform the selection of one of a plurality of configuration memory contexts in response to the received data when the masked virtual identification of the first multiple context processing element equals the masked destination identification.

\* \* \* \* \*